(12) United States Patent
Kou et al.

(10) Patent No.: US 10,808,078 B2
(45) Date of Patent: Oct. 20, 2020

(54) POLYALKYLENE IMINE BASED POLYMERS HAVING POLYESTER GROUPS

(71) Applicant: BASF SE, Ludwigshafen am Rhein (DE)

(72) Inventors: Huiguang Kou, Viernheim (DE); Clemens Auschra, Freiburg (DE); Matthias Maier, Sandhausen (DE); Steffen Onclin, Neustadt (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/998,745

(22) PCT Filed: Feb. 8, 2017

(86) PCT No.: PCT/EP2017/052675
§ 371 (c)(1),
(2) Date: Aug. 16, 2018

(87) PCT Pub. No.: WO2017/140538
PCT Pub. Date: Aug. 24, 2017

(65) Prior Publication Data
US 2019/0092903 A1    Mar. 28, 2019

(30) Foreign Application Priority Data

Feb. 16, 2016  (EP) .................................. 16155961

(51) Int. Cl.
| | | |
|---|---|---|
| C08G 73/02 | (2006.01) | |
| C08G 81/00 | (2006.01) | |
| C09B 67/46 | (2006.01) | |
| B01F 17/00 | (2006.01) | |
| C09D 5/02 | (2006.01) | |
| C09D 179/04 | (2006.01) | |

(52) U.S. Cl.
CPC ........ C08G 73/0206 (2013.01); B01F 17/005 (2013.01); C08G 73/0233 (2013.01); C08G 81/00 (2013.01); C09B 67/009 (2013.01); C09D 5/027 (2013.01); C09D 179/04 (2013.01)

(58) Field of Classification Search
CPC .. C09B 67/009; C08G 73/0206; C08G 81/00; B01F 17/005; C09D 5/027; C09D 179/04
See application file for complete search history.

(56) References Cited

U.S. PATENT DOCUMENTS

| | | |
|---|---|---|
| 2004/0194665 A1 | 10/2004 | Konemann et al. |
| 2010/0022662 A1 | 1/2010 | Goebelt et al. |
| 2010/0174046 A1 | 7/2010 | Liu et al. |
| 2012/0071593 A1 | 3/2012 | Andre et al. |

FOREIGN PATENT DOCUMENTS

| | | |
|---|---|---|
| DE | 2 202 527 | 9/1973 |
| EP | 0 208 041 A2 | 1/1987 |
| EP | 2 272 893 A1 | 1/2011 |
| JP | 3215756 B2 | 10/2001 |
| WO | WO 94/21368 A1 | 9/1994 |
| WO | WO 98/19784 A1 | 5/1998 |
| WO | WO 01/21298 A1 | 3/2001 |
| WO | WO 2007/110333 A1 | 10/2007 |

OTHER PUBLICATIONS

Extended European Search Report dated Aug. 11, 2016 in European Patent Application No. 16155961.2, 3 pages.
International Search Report dated Apr. 26, 2017, in PCT/EP2017/052675 filed Feb. 8, 2017.

*Primary Examiner* — Shane Fang
(74) *Attorney, Agent, or Firm* — Oblon, McClelland, Maier & Neustadt, L.L.P.

(57) ABSTRACT

The present invention relates to polyalkylene imine based polymers, which have aliphatic polyester groups attached to the polyalkylenimine backbone via an carboxamide group. The novel polymers are particularly useful as dispersants for pigments, in particular as dispersants for pigments in non-aqueous compositions. The polyalkylene imine based polymers are characterized by having a) a polyalkylene imine backbone; b) at least one aromatic moiety P.1, which is bound to a nitrogen atom of the polyalkylene imine backbone via an carboxamide or carboximide group; and c) at least one aliphatic polyester moiety P.2, which is bound to a nitrogen atom of the polyalkylene imine backbone via an carboxamide group.

15 Claims, No Drawings

POLYALKYLENE IMINE BASED POLYMERS HAVING POLYESTER GROUPS

The present invention relates to polyalkylene imine based polymers, which have aliphatic polyester groups attached to the polyalkylenimine backbone via an carboxamide group. The novel polymers are particularly useful as dispersants for pigments, in particular as dispersants for pigments in non-aqueous compositions.

BACKGROUND OF THE INVENTION

Pigments are ordinarily organic or inorganic dry powders that incorporate a mixture of primary particles, aggregates and agglomerates. For both industrial and consumer coating compositions, whether solvent borne or water borne, the pigment should be dispersed homogeneously throughout the coating composition in order to ensure a uniform appearance of the final coating. To be properly dispersed, pigments are usually wetted, deaggregated and deagglomerated in a vehicle to obtain a dispersion of the pigment particles. Wetting involves incorporation of the pigment into the vehicle replacing pigment-air interfaces with pigment-vehicle interfaces. Wetting agents facilitate bringing pigments into a dispersed state as a result of surface activity at the pigment-solution interface. An ideal pigment dispersion consists of a homogenous suspension of particles, after reducing the size of any aggregates and agglomerates.

While some organic vehicles may be good pigment wetting agents themselves, dispersants are typically added to the liquid vehicle to ensure thorough pigment dispersion throughout the vehicle. Dispersants can also be used to temporarily stabilize the pigment dispersion from re-aggregating and re-agglomerating. Problems that occur with current available pigment compositions include (i) a separation or settling of the compositions into their components over time which can require periodic remixing or stirring, and (ii) an undesirable change in rheological profile.

Liquid pigment compositions containing pigments and fillers and a liquid vehicle are used in an almost unlimited number of different technical applications, in particular for colouring coating compositions, including solvent and water-borne paints, heavy duty coatings, automotive coatings, in printing inks, or for colouring cosmetics, plastics, etc.

The function of dispersants is manifold. Mainly, they act as stabilizers for the solid fine particulate materials in the liquid pigment compositions, i.e. the dispersant separates the particles of the solid fine particulate material and thus prevents them from coagulation or clumping and settling from the liquid vehicle. They also may act as solubilizers in the given carrier liquid of a coating composition. Dispersants may also improve the optical properties of the coatings, such as gloss, colour intensity or rub-out characteristics. Depending on the type and polarity of the vehicle, e.g. water, organic solvents or mixtures thereof, polymers of variable structure are used as dispersants.

Sometimes, dispersants act as flow control assistants and bring about improved spreading of the composition over the surface of the substrate, and improve flow of the polymer film which forms in the course of curing, resulting in a smooth surface. On account of their capacity to promote the flow of the polymer film, which forms in the course of curing, these agents reduce the formation of defects, known as craters, which are caused by impurities acting from the outside or by impurities on the surface of the substrate.

A general survey on the different types of polymeric dispersants, their polymeric architecture and their properties is given by F. Pirrung and C. Auschra in Macromolecular Engineering, Precise Synthesis, Materials Properties, Applications (ed. K. Matyjaszewski et al.), chapter 4, polymeric dispersants, pp. 2135-2180.

EP 208041 describes a dispersant comprising a poly($C_{2-4}$-alkyleneimine) and aliphatic polyester groups, in particular poly-(carbonyl-$C_{1-7}$-alkyleneoxy) groups which are bound to the poly($C_{2-4}$-alkyleneimine). These dispersants are prepared by reacting a poly($C_{2-4}$-alkyleneimine) with an aliphatic polyester having a terminal carboxyl group, particularly with a polylactone, which is obtained by carboxylic acid initiated ring-opening polymerization of lactones, such as caprolactone. The polyester groups are connected to the poly($C_{2-4}$-alkyleneimine) through both quaternization (formation of salt bonds) and amidification (formation of carboxamide groups), both salt bonds and carboxamide groups formed by the reaction terminal carboxyl group of the polyester and the amine group of the poly($C_{2-4}$-alkyleneimine). The salt bond is easily cleaved and free $NH_2$ groups are formed resulting in yellowing of the final resin.

WO 94/21368 describes a dispersant similar to that of EP 208041 and salts thereof, wherein the repeating units of the polyester groups are derived from a combination of 6-hydroxyhexanoic acid and further hydroxycarboxylic acid, selected from ricinoleic acid, 12-hydroxystaric acid, 12-hydroxydodecanoic acid, 5-hydroxydodecanoic acid, 5-hydroxydecanoic acid and 4-hydroxydecanoic acid.

WO 98/19784 describes polymers of the formula T-$(A)_n$$(B)_p$—Z, where T is hydrogen or a polymerization terminating group, such as lauric acid, A and B are oxyalkylene carbonyl groups derived from valerolactone, caprolactone or alkyl-substituted caprolactone, n and p are integers with n+p being 2 to 100 and Z is an acidic group or a basic group, such as phosphate or polyethylene imine. The polymers, where Z is a basic polyalkylene imine group, are prepared by analogy to the methods described in EP 208041 and WO 94/21368, respectively.

JP 3215756 discloses a polyalkylene imine based graft polymer, which is prepared by ring-opening polymerisation of a lactone with a polyalkylene imine. The polymer obtained by this process has a backbone of polyalkylene imine with pending aliphatic polyester groups linked by amide linkages.

WO 01/21298 describes a polyalkylene imine based graft polymer with two different types of polyester groups, the first type of polyester groups being derivable from hydroxycarboxylic acids having a $C_1$-$C_6$-alkylene group and the second type of polyester groups being derivable from hydroxycarboxylic acids having a $C_8$-$C_{30}$-alkylene or $C_8$-$C_{30}$-alkenylene group. The polyalkylene imine based graft polymers are prepared in a stepwise manner or by reacting with two types of performed polyesters.

WO 2007/11033 describes dispersants, which have two types of polyester groups bound to a polyalkylene imine backbone, the first type of polyester groups being formed exclusively from hydroxycarboxylic acids having a $C_4$-$C_5$-alkylene group and the second type of polyester groups being formed from a combination of hydroxycarboxylic acids having a $C_4$-$C_5$-alkylene group and a long-chain fatty acid or hydroxyfatty acid, such as ricinoleic acid, where the long-chain fatty acid or hydroxyfatty acid is located at the distal terminus of the polyester group. The dispersants are prepared by reacting a hydroxycarboxylic acid having a $C_4$-$C_5$-alkylene group or the corresponding lactone and a long-chain fatty acid or hydroxyfatty acid with the polyalkylene imine.

EP 2272893 describes a polymeric dispersant including at least one oxalylamide structural unit containing a first polymeric moiety selected from the group consisting of a linear polymeric moiety, a star shaped polymeric moiety, a dendritic polymeric moiety, a branched polymeric moiety and a hyperbranched polymeric moiety; and a second polymeric moiety selected from the group consisting of a polyester, a polyether, a polyamide, a polyacrylate, a polymethacrylate or copolymers thereof. The dispersants are prepared by reacting the oxalylamide polymer with said polymeric moieties.

The dispersants described in the art suffer from several disadvantages. First of all, they significantly increase the viscosity of liquid pigment compositions, in particular if the pigment is present at high loadings, such as in pigment pastes. Moreover, if used in coating compositions, the gloss of the coating may be not satisfactory and/or yellowing or cratering of the coating may occur. Therefore, there is an ongoing need for polymers, which are suitable as dispersants for pigments and which provide reduced viscosity, in particular at high pigment loadings, and improved optical properties of the coatings, such as gloss, colour intensity, reduced yellowing, rub-out characteristics or reduced cratering.

SUMMARY OF THE INVENTION

It was surprisingly found that the above problems are solved by the polyalkylene imine based polymers described hereinafter, which have at least one aliphatic polyester group P.2 attached to the polyalkylenimine backbone via a carboxamide group and which also have at least one aromatic moiety P.1, which is bound to a nitrogen atom of the polyalkylene imine backbone via an carboxamide or carboximide group. These polyalkylene imine based polymers are suitable as dispersants for fine particulate materials, such as pigments and fillers in organic vehicles and therefore allow the preparation of liquid pigment compositions, which can be easily incorporated into coating compositions, in particular into solvent borne coating compositions.

Therefore, a first aspect of the present invention relates to polyalkylene imine based polymers having
a) a polyalkylene imine backbone;
b) at least one aromatic moiety P.1, which is bound to a nitrogen atom of the polyalkylene imine backbone via an carboxamide or carboximide group; and
c) at least one aliphatic polyester moiety P.2, which is bound to a nitrogen atom of the polyalkylene imine backbone via an carboxamide group.

The new polyalkylene imine based polymers of the invention can be prepared by the following to processes 1 and 2, as described herein. These processes are also part of the invention.

Process 1 is a two step process and comprises the following steps:
i) reacting a polyalkylene imine with an aromatic carboxylic acid or with an amide or imide forming derivative of an aromatic carboxylic acid, in such an amount that theoretically at most 90 mol-%, in particular at most 60 mol-%, e.g. 1 to 90 mol-%, in particular 10 to 60 mol-%, based on the total amount of primary and secondary nitrogen atoms of the polyalkylene imine, can be consumed, thereby forming the moiety P.1 and ii) reacting the product of step i) with an aliphatic polyester, having a terminal carboxyl group, or with at least one monomer, which reacts with the polyalkylene imine by formation of at least one aliphatic polyester group P.2, which is attached to a nitrogen atom of the polyalkylene imine backbone via an carboxamide group.

Process 2 is a single-step process and comprises reacting a polyalkylene imine with an aromatic carboxylic acid or with an amide or imide forming derivative of an aromatic carboxylic acid, in such an amount that theoretically at most 90 mol-%, in particular at most 60 mol-%, e.g. 1 to 90 mol-%, in particular 10 to 60 mol-%, based on the total amount of primary and secondary nitrogen atoms of the polyalkylene imine, can be consumed, and with at least one monomer, which reacts with the polyalkylene imine by formation of at least one aliphatic polyester group P.2, thereby forming a polyalkylene imine polymer which bears both moieties P.1 and P.2 as described above.

Both process 1 and process 2 are condensation reactions, which result in a mixture of polymer molecules having on average at least one, usually a multitude of moieties P.1 and also at least one, usually a multitude of moieties P.2.

The polyalkylene imine based polymers of the invention, including their mixtures and the salts thereof, in particular the mixtures, which are obtained by the processes of the invention, and the salts thereof, are suitable as dispersants for pigment materials and work in particular in hydrophobic carriers. They provide for a good rheological behavior of the pigment composition and allow for formulation of pigment compositions, which can be easily incorporated in solvent borne coating compositions, which provide a high gloss and low cratering. In addition, good color strength and also good rub out characteristics can be achieved.

Therefore, the present invention also relates to the use of the polyalkylene imine based polymers as described herein, including their mixtures and the salts thereof, as dispersants in liquid pigment compositions, in particular in non-aqueous, i.e. solvent based, liquid pigment compositions, in particular in pigment pastes or millbase and also as colorants for pigment containing coating compositions and inks. The present invention also relates to the use of the polyalkylene imine based polymers as described herein, including their mixtures and the salts thereof, as dispersants in liquid coating compositions, in particular in solvent-borne coating compositions.

The present invention also relates to liquid pigment composition, comprising a polyalkylene imine based polymer as described herein, or a mixture thereof, or a salt thereof as described herein, a pigment component and a liquid, in particular a non-aqueous, diluent.

DETAILED DESCRIPTION OF THE INVENTION

Here and in the following, the term "pigment component" relates to pigments and mixtures of at least one pigment and at least one particulate non-pigment material, hence, filler.

Here and in the following the prefix $C_n$-$C_m$ indicates the number of carbon atoms a radical or compound may have. For example, the prefix $C_1$-$C_4$ indicates that the radical, moiety or compound may have from 1 to 4 carbon atoms.

If not stated otherwise, alkyl denominates a saturated linear or branched, acyclic hydrocarbon radical, which may have from 1 to 20 carbon atoms ($C_1$-$C_{20}$-alkyl).

The term $C_1$-$C_4$-alkyl (also in context of the groups (C=O)—$C_1$-$C_4$-alkyl, NH—$C_1$-$C_4$-alkyl and NH—(C=O)—$C_1$-$C_4$-alkyl) indicates alkyl having from 1 to 4 carbon atoms, such as methyl, ethyl, n-propyl, 2-propyl, n-butyl, 2-butyl, isobutyl, 1,1-dimethylethyl.

The term $C_1$-$C_6$-alkyl indicates alkyl having from 1 to 6 carbon atoms, such as methyl, ethyl, n-propyl, 2-propyl, n-butyl, 2-butyl, isobutyl, 1,1-dimethylethyl, n-pentyl, 2-pentyl, neopentyl, n-hexyl, 2-hexyl, 2-methylpentyl, 1,3-dimethylbutyl, 1-ethylbutyl, 2-ethylbutyl, etc.

The term $C_6$-$C_{20}$-alkyl (and also in context of the group $C(=O)$—$C_6$-$C_{20}$-alkyl) indicates alkyl having from 6 to 20 carbon atoms, such as n-hexyl, 2-hexyl, 2-methylpentyl, 1,3-dimethylbutyl, 1-ethylbutyl, 2-ethylbutyl, n-heptyl, 1-methylhexyl, 2-methylhexyl, 3-methylhexyl, 4-methylhexyl, 5-methylhexyl, 1-ethyl pentyl, 2-ethyl pentyl, 3-ethylpentyl, n-octyl, 1-methylheptyl, 2-methylheptyl, 1-ethylhexyl, 2-ethylhexyl, 1,2-dimethylhexyl, 1-propylpentyl, 2-propyl pentyl, n-nonyl, decyl, 2-propylheptyl, 3-propylheptyl, n-undecyl, n-dodecyl, n-tridecyl, n-tetradecyl, n-hexadecyl, n-octadecyl, n-eicosyl, and constitutional isomers of the aforementioned n-alkyl radicals.

If indicated $C_1$-$C_{20}$-alkyl may carry 1 or 2 OH groups, such as in 2-hydroxethyl, 3-hydroxypropyl, 4-hydroxybutyl, 5-hydroxypentyl, 6-hydroxyhexyl, 15-hydroxypentadecyl, 17-hydroxyheptadecyl or 9,15-dihydroxypentadecyl.

If indicated 1, 2, 3, or 4 non-adjacent $CH_2$ groups of $C_1$-$C_{20}$-alkyl may be replaced by O. Examples of such radicals include $C_1$-$C_4$-alkoxy-$C_1$-$C_4$-alkyl, such as methoxymethyl ethoxymethyl, propoxymethyl, 2-methoxyethyl 2-ethoxyethyl, 2-propoxyethyl, 2-methoxypropyl 2-ethoxypropyl, 2-propoxypropyl, 3-methoxypropyl 3-ethoxypropyl, 3-propoxypropyl, 4-methoxybutyl 4-ethoxybutyl, 4-propoxybutyl, but also oligoether radicals of the formula H[O-alk]$_n$, or R—[O-alk]$_n$, where n is 2, 3 or 4, alk indicates 1,2-ethandiyl, 1,2-propandiyl, 1,3-propandiyl, 1,2-butandiyl or 1,4-butandiyl and R indicates $C_1$-$C_4$-alkyl.

Alkenyl (also in context of the group $C(=O)$—$C_2$-$C_{20}$-alkenyl) denominates an ethylenically unsaturated linear or branched hydrocarbon radical, which may have from 2 to 20 carbon atoms ($C_2$-$C_{20}$-alkenyl) and which may have 1, 2, 3 or 4 C=C double bonds. Examples of alkenyl include but are not limited to ethenyl, 1-propenyl, prop-2-en-1-yl (allyl), but-2-en-1-yl, but-3-en-1-yl, isobutene-1-yl, isobutene-3-yl, pent-2-en-1-yl, pent-3-en-1-yl, pent-4-en-1-yl, hex-2-en-1-yl, hex-3-en-1-yl, hex-4-en-1-yl, hex-5-en-1-yl, hept-2-en-1-yl, hept-3-en-1-yl, hept-4-en-1-yl, hept-5-en-1-yl, hept-6-en-1-yl, oct-2-en-1-yl, oct-3-en-1-yl, oct-4-en-1-yl, oct-5-en-1-yl, oct-6-en-1-yl, oct-7-en-1-yl, tridec-8-en-1-yl, tridec-5-en-1-yl, tetradec-5-en-1-yl, tetradec-8-en-1-yl, pentadec-5-en-1-yl, pentadec-8-en-1-yl, hexadec-5-en-1-yl, hexadec-8-en-1-yl, heptadec-5-en-1-yl, heptadec-8-en-1-yl, heptadec-10-en-1-yl, heptadec-8,11-dien-1-yl, heptadec-8,11,13-trien-1-yl, etc. The term $C_6$-$C_{20}$-alkenyl (and also in context of the group $C(=O)$—$C_6$-$C_{20}$-alkenyl) indicates alkenyl having from 6 to 20 carbon atoms.

If indicated $C_2$-$C_{20}$-alkenyl may carry 1 or 2 OH groups such as in 11-hydroxyheptadec-8-en-1-yl.

The term $C_1$-$C_4$-alkoxy (also in context of the group $C_1$-$C_4$-alkoxy-$C_1$-$C_4$-alkyl) indicates alkyl having from 1 to 4 carbon atoms which is bound to the remainder of a moiety via an oxygen atom. Examples of $C_1$-$C_4$-alkoxy include methoxy, ethoxy, n-propoxy, 2-propoxy, n-butoxy, 2-butoxy, isobutoxy and 1,1-dimethylethoxy.

Aryl denominates an aromatic hydrocarbon radical such as phenyl or naphthyl, which may have a fused carbocyclic ring, such as in indanyl, indenyl, fluorenyl, etc. Aryl denominates in particular phenyl and naphthyl. Arylene denominates a bivalent aromatic hydrocarbon radical such as phenylene or naphthylene. Aryl and arylene may be unsubstituted or substituted, e.g. by 1, 2, 3, 4 or 5 radicals R, which are, independently of each other, preferably selected from the group consisting of halogen, OH, $C_1$-$C_4$-alkyl, $C_1$-$C_4$-alkoxy, COOH, CONH$_2$, NH$_2$, NO$_2$, NH—CHO, NH—$C_1$-$C_4$-alkyl, and NH—$(C=O)$—$C_1$-$C_4$-alkyl.

Alkylen and alkandiyl denominate linear or branched, saturated bivalent hydrocarbon radicals having usually 1 to 8 carbon atoms, such as methylene, 1,2-ethandiyl, 1,1-ethandiyl, 1,1-propandiyl, 1,2-propandiyl, 2,2-propandiyl, 1,3-propandiyl, 2-methyl-2,3-propandiyl, 1,1-butandiyl, 1,2-butandiyl, 2,2-butandiyl, 2,3-butandiyl, 1,3-butandiyl, 1,4-butandiyl, pentan-1,5-diyl, pentan-2,5-diyl, 2,2-dimethylpropan-1,3-diyl, hexan-1,6-diyl, heptan-1,7-diyl, heptan-1,6-diyl, 2-methylhexan-1,6-diyl, 1-methylheptan-1,6-diyl, 2-methylheptan-1,6-diyl, 2-methylheptan-1,7-diyl, and octan-1,8-diyl.

The term linear $C_2$-$C_8$-alkylene denominates a bivalent hydrocarbon radical of the formula $(CH_2)_k$, with k being 2, 3, 4, 5, 6, 7 or 8. Examples include ethan-1,2-diyl, propan-1,3-diyl, butan-1,4-diyl, pentan-1,5-diyl, hexan-1,6-diyl, heptan-1,7-diyl and octan-1,8-diyl. If indicated, linear $C_2$-$C_8$-alkylene may be substituted with 1, 2, 3, or 4 $C_1$-$C_4$-alkyl radicals, in particular with 1, 2, 3, or 4 methyl radicals.

If not indicated otherwise, the term polyester group, polyester moiety and polyester chain are used as synonyms.

The polymers of the invention bear at least one, e.g. on average 1 to 250, in particular 2 to 150 and especially 5 to 100 aromatic moieties P.1 per polymer molecule. In this context, the term "on average" is understood as the number average. Each of the moieties P.1 is bound to a nitrogen atom of the polyalkylene imine backbone via a carboxamide or carboximide group. The aromatic moiety P.1 comprises either an optionally substituted aryl, which is bound to a nitrogen atom of the polyethylene imine radical via a carbonyl group, thereby forming a carboxamide group, or an optionally substituted arylene radical which is bound to a nitrogen atom of the polyethylene imine radical via two carbonyl groups, thereby forming a carboximide group. The aryl or arylene moieties of P.1 are unsubstituted or substituted, e.g. by 1, 2, 3, 4 or 5 radicals, which are preferably selected from halogen, OH, $C_1$-$C_4$-alkyl, $C_1$-$C_4$-alkoxy, COOH, CONH$_2$, NH$_2$, NO$_2$, NH—CHO, NH—$C_1$-$C_4$-alkyl, and NH—$(C=O)$—$C_1$-$C_4$-alkyl. Within the polymers of the invention, the radicals P.1 may be identical or different. Frequently, they are identical.

The moieties P.1 will generally contribute by an amount of 1 to 25% by weight, in particular from 1.5 to 15% by weight or from 2 to 10% by weight to the total weight of the polymer. The relative amount of the moieties P.1 to the polyalkylene imine may be from 10 to 200% by weight, in particular from 20 to 150% by weight.

Preferably, the moiety P.1 is selected from the moieties of the formula (P.1') and (P.1")

where
# indicates the point of attachment to a nitrogen atom of the polyalkylene imine backbone, Ar is phenyl or naphthyl, wherein phenyl and naphthyl, each independently are unsubstituted or carry 1, 2, 3, 4 or 5 radicals R, which are selected from halogen, OH, $C_1$-$C_4$-alkyl, $C_1$-$C_4$-alkoxy, COOH, $CONH_2$, $NH_2$, $NO_2$, NH—CHO, NH—$C_1$-$C_4$-alkyl, and NH—(C=O)—$C_1$-$C_4$-alkyl, Ar' is 1,2-phenylen, 1,2-, 2,3-, or 1,8-naphthylen, wherein phenylen and naphthylen, each independently are unsubstituted or carry 1, 2, 3, 4 or 5 radicals R, which are selected from halogen, OH, $C_1$-$C_4$-alkyl, $C_1$-$C_4$-alkoxy, COOH, $CONH_2$, $NO_2$, $NH_2$, NH—CHO, NH—$C_1$-$C_4$-alkyl, and NH—(C=O)—$C_1$-$C_4$-alkyl.

In this context, Ar and Ar' preferably have the following meanings:

Ar is phenyl or 1-naphthyl, wherein phenyl and naphthyl, each independently are unsubstituted or carry 1, 2 or 3 radicals R, in particular 1 or 2 radicals R, where R are identical or different and independently of each other are selected from halogen, OH, $C_1$-$C_4$-alkyl, $C_1$-$C_4$-alkoxy, COOH, $CONH_2$, $NH_2$, $NO_2$, NH—CHO, NH—$C_1$-$C_4$-alkyl, and NH—(C=O)—$C_1$-$C_4$-alkyl, Ar' is 1,2-phenylen or 1,8-naphthylen, wherein phenylen and naphthylen each independently are unsubstituted or carry 1, 2 or 3 radicals R, in particular 1 radical R, where R are identical or different and independently of each other are selected from halogen, OH, $C_1$-$C_4$-alkyl, $C_1$-$C_4$-alkoxy, COOH, $CONH_2$, $NH_2$, $NO_2$, NH—CHO, NH—$C_1$-$C_4$-alkyl, and NH—(C=O)—$C_1$-$C_4$-alkyl.

In the context of formulae P.1', P.1'', the substituents R on phenylene or naphthylene, if present, are in particular selected from the group consisting of Cl, $NH_2$, $NO_2$, COOH, NH—CHO, NH—$CH_3$, and NH—(C=O)—$CH_3$.

In particular, the moiety P.1 is selected from the group consisting of radicals of the formulae (P.1a), (P.1 b), (P.1c), (P.1 d), and (P.1e),

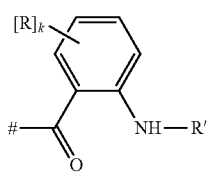
(P.1a)

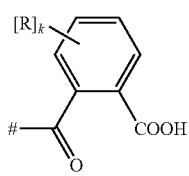
(P.1b)

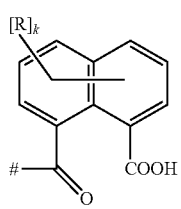
(P.1c)

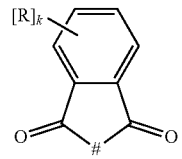
(P.1d)

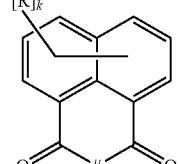
(P.1e)

wherein
# indicates the point of attachment to a nitrogen atom of the polyalkylene imine backbone, k is 0, 1, 2, 3 or 4, in particular 0 or 1, R' is hydrogen, $C_1$-$C_4$-alkyl, —CHO, or —(C=O)—$C_1$-$C_4$-alkyl, in particular hydrogen, methyl CHO or —(C=O)—$CH_3$ and especially methyl;

R is independently or identical selected from the group consisting of halogen, OH, $NO_2$, $C_1$-$C_4$-alkyl, $C_1$-$C_4$-alkoxy, $CONH_2$, NH—CHO, NH—$C_1$-$C_4$-alkyl, and NH—(C=O)—$C_1$-$C_4$-alkyl.

In the context of formulae P.1a, P.1b, P.1c, P.1d and P.1e, the radical R, if present, is in particular selected from the group consisting of Cl, $NH_2$, $NO_2$, NH—CHO, NH—$CH_3$, and NH—(C=O)—$CH_3$.

Examples of moieties P.1 include 2-aminophenylcarbonyl (P.1a with k=0), 2,5-diaminophenylcarbonyl (P.1a with k=1, R=5-$NH_2$), 2-amino-5-bromophenyl-carbonyl (P.1a with k=1, R=5-Br), 2-carboxyphenylcarbonyl (P.1b with k=0), 2,4-dicarboxyphenylcarbonyl (P.1b with k=1, R=4-COOH), 8-carboxynaphthyl-1-carbonyl (P.1c with k=0), 3-bromo-8-carboxynaphthyl-1-carbonyl (P.1c with k=1, R=3-bromo), 6-bromo-8-carboxynaphthyl-1-carbonyl (P.1c with k=1, R=6-bromo), 3-nitro-8-carboxynaphthyl-1-carbonyl (P.1c with k=1, R=3-$NO_2$), 4-nitro-8-carboxy-naphthyl-1-carbonyl (P.1c with k=1, R=4-$NO_2$), 5-nitro-8-carboxynaphthyl-1-carbonyl (P.1c with k=1, R=5-$NO_2$), 6-nitro-8-carboxynaphthyl-1-carbonyl (P.1c with k=1, R=6-$NO_2$), 1,2-phenylendicarbonyl (radical P.1d with k=0), 4-carboxy-1,2-phenylen-dicarbonyl (radical P.1d with k=1, R=4-COOH), 1,8-nahpthylendicarbonyl (radical P.1e with k=0), 3-bromo-1,8-nahpthylendicarbonyl (radical P.1e with k=1, R=3-Br), 3-nitro-1,8-nahpthylendicarbonyl (radical P.1e with k=1, R=3-$NO_2$), 4-nitro-1,8-nahpthylendicarbonyl (radical P.1e with k=1, R=4-$NO_2$).

The polymers of the invention bear at least one, e.g. on average 1 to 400, in particular 5 to 250 and especially 10 to 150 aliphatic polyester moieties P.2 per polymer molecule. In this context, the term "on average" is understood as the number average. Each of the moieties P.2 is bound to a nitrogen atom of the polyalkylene imine backbone via a carboxamide group. The term "aliphatic" means that the polyester groups do not contain aromatic rings. In particular, the polyester radicals bear repeating units having a $C_2$-$C_8$-alkylene moiety, which is unsubstituted or carries 1, 2, 3, or 4 $C_1$-$C_4$-alkyl radicals. Within the polymers of the invention, the moieties P.2 may be identical or different. Frequently, they are identical.

The moieties P.2 will generally contribute by an amount of 50 to 98% by weight, in particular from 70 to 97% by weight or from 80 to 96% by weight to the total weight of the polymer. The weight ratio of the moieties P.2 to the polyalkylene imine is generally in the range from 1:1 to 98:1, in particular from 2:1 to 97:1 or from 3:1 to 50:1.

Preferably, the moiety P.2 is a radical of the formula (P.2):

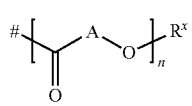
(P.2)

wherein
# indicates the point of attachment to a nitrogen atom of the polyalkylene imine backbone,
n is a number in the range of 2 to 100, in particular in the range of 3 to 50, especially in the range of 4 to 25;
A is independently from each other linear $C_2$-$C_8$-alkylene, in particular linear $C_3$-$C_6$-alkylene, where alkylene is unsubstituted or carries 1, 2, 3, or 4 $C_1$-$C_4$-alkyl radicals, and
$R^x$ is hydrogen, $C_1$-$C_{20}$-alkyl, $C_2$-$C_{20}$-alkenyl, $C(=O)$—$C_2$-$C_{20}$-alkenyl or $C(=O)$—$C_1$-$C_{20}$-alkyl, wherein $C_1$-$C_{20}$-alkyl and $C_2$-$C_{20}$-alkenyl in the last four radicals are unsubstituted or carry 1 or 2 OH groups, wherein $C_2$-$C_{20}$-alkenyl has 1, 2, 3 or 4 olefinic C=C-double bonds, and wherein 1, 2, 3, or 4 non-adjacent $CH_2$ groups of $C_1$-$C_{20}$-alkyl may be replaced by O.

The variables A and $R^x$ in the at least one moiety (P.2) have in particular the following meanings
A is linear $C_3$-$C_6$-alkylene, more particularly 1,4-butandiyl or 1,5-pentandiyl or a combination thereof, and especially a combination of 1,4-butandiyl and 1,5-pentandiyl having a molar ratio of 1,4-butandiyl and 1,5-pentandiyl in the range of 1:20 to 10:1;
$R^x$ is hydrogen, $C(=O)$—$C_6$-$C_{20}$-alky or $C(=O)$—$C_6$-$C_{20}$-alkenyl, wherein $C_6$-$C_{20}$-alkyl and $C_6$-$C_{20}$-alkenyl are unsubstituted or carry 1 or 2 OH groups and where $R^x$ is especially $C(=O)$—$C_{10}$-$C_{20}$-alky or $C(=O)$—$C_{10}$-$C_{20}$-alkenyl, wherein $C_{10}$-$C_{20}$-alkyl and $C_{10}$-$C_{20}$-alkenyl are unsubstituted or carry 1 or 2 OH groups.

The polymers of the invention have a polyalkylenimine backbone, to which the at least one moiety P.1 and the at least one moiety P.2 are attached.

The polyalkylene imine may be linear or branched. The polyalkylene imine is in particular a linear or branched poly($C_2$-$C_4$-alkyleneimine), more particular a linear or branched polypropylene imine, a linear or branched poly(ethylene imine-co-propylene imine) or a linear or branched polyethylene imine or a mixture thereof. Especially, the polyalkylene imine, which forms the backbone, is a linear or branched polyethylene imine.

The polyalkylene imine will usually have on average from 5 to 500, in particular from 10 to 250 especially from 20 to 100 alkylene imine repeating units, which corresponds to a number average molecular weight of the polyalkylene imine backbone in the range from about 200 to 20000 g/mol, in particular in the range from 400 to 10000 g/mol and especially in the range from 800 to 5000 g/mol.

The polyalkylene imine backbone will generally contribute by an amount of 1 to 25% by weight, in particular from 1.5 to 15% by weight or from 2 to 10% by weight to the total weight of the polymer.

Both moieties P.1 and P.2 are attached to nitrogen atoms of the polyalkylene imine backbone. As these nitrogen atoms are part of a carboxamide or carboximide group, their basicity is low compared to nitrogen atoms of a non-modified polyalkylene imine. It is apparent to a skilled person that polymers of the invention may have nitrogen atoms, which do not carry moieties P.1 and P.2. These nitrogen atoms are basic and susceptible to protonation or quaternization. Polymers of the invention, which have nitrogen atoms, which do not carry moieties P.1 and P.2, will usually have an amine number >0 mg KOH/g, e.g. in the range from 2 to 150 mg KOH/g, in particular from 5 to 50 mg KOH/g.

As explained above, polymers of the invention, which have an amine number >0 mg KOH/g, e.g. in the range from 2 to 150 mg KOH/g, in particular from 5 to 50 mg KOH/g are susceptible to protonation or quaternization, which means that at least some of the nitrogen atoms of the polyalkylene imine backbone that do not carry moieties P.1 or P.2, hence amino groups of the polyalkylene imine backbone, can be transformed into cationic, i.e. into protonated or quaternized aminogroups. Therefore, one embodiment of the invention relates to polymers, wherein the polyalkylene imine backbone in addition to the moieties P.1 and P.2 has protonated or quaternized amino groups. In this embodiment, the amount of protonated or quaternized amino groups is generally from 0.01 to 0.5 mol/kg.

Another embodiment of the invention relates to polymers, wherein the polyalkylene imine backbone in addition to the moieties P.1 and P.2 does not have quaternized amino groups. In this embodiment, the amount of quaternized amino groups is less than 0.01 mol/kg.

Depending of the type of amino nitrogen atom (primary, secondary or tertiary), the protonated or quaternized amino groups can be described by the following formulae Q1, Q2 and Q3:

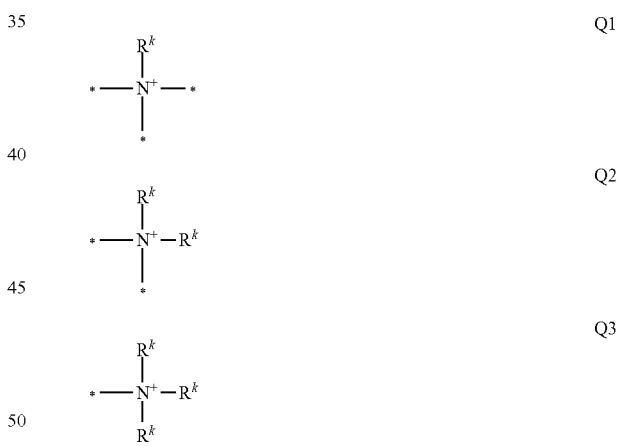

where $R^k$ indicates a H (protonized groups Q1, Q2 and Q3) or an optionally substituted hydrocarbon radical such as alkyl, aryl, arylalkyl or cycloalkyl (quaternized groups Q1, Q2 and Q3).

Frequently, $R^k$ is selected from the group consisting of hydrogen,
$C_1$-$C_{20}$-alkyl, which is unsubstituted or carries 1 or 2 OH groups and wherein 1, 2, 3, or 4 non-adjacent $CH_2$ groups of $C_1$-$C_{20}$-alkyl may be replaced by O;
$C_2$-$C_{20}$-alkenyl, which has 1, 2, 3 or 4 olefinic C=C-double bonds and which is unsubstituted or carries 1 or 2 OH groups,
aryl, such as phenyl or naphthyl, where the aryl part is unsubstituted or carries 1, 2, 3, 4 or 5 substituents, which are selected from the group consisting of halogen, OH, NO$_2$, COOH, C$_1$-C$_4$-alkyl, C$_1$-C$_4$-alkoxy, CONH$_2$, NH—CHO, and NH—(C=O)—C$_1$-C$_4$-alkyl, and aryl-CH$_2$, such as benzyl, 1-naphthylmethyl or 2-naphthylmethyl, where the aryl part is unsubstituted or carries 1, 2, 3, 4 or 5 substituents, which are selected from the group consisting of halogen, OH, NO$_2$, COOH, C$_1$-C$_4$-alkyl, S—C$_1$-C$_4$-alkyl, S(O)$_2$—C$_1$-C$_4$-alkyl, C$_1$-C$_4$-alkoxy, CONH$_2$, NH—CHO, and NH—(C=O)—C$_1$-C$_4$-alkyl.

In particular R$^k$ is selected from the group consisting of hydrogen,

C$_1$-C$_{10}$-alkyl, which is unsubstituted or carries 1 or 2 OH groups;

benzyl, where the phenyl ring part is unsubstituted or carries 1, 2 or 3 substituents, which are selected from the group consisting of halogen, OH, NO$_2$, C$_1$-C$_4$-alkyl and C$_1$-C$_4$-alkoxy.

The positive charge of the quaternized or protonized groups is neutralized by suitable anions including halogenide, such as chloride or bromide, sulfate (SO$_4^{2-}$), hydrogensulfate (HSO$_4^-$), alkylcarboxylate, such as acetate or propionate, arylcarboxylates, where the aryl ring is unsubstituted or optionally substituted by C$_1$-C$_4$-alkyl, C$_1$-C$_4$-alkoxy, NO$_2$, hydroxyl or halogen, such as benzoate, C$_1$-C$_4$-alkylbenzoate, 2-hydroxybenzoate, 4-hydroxybenzoate, 1-naphthoate, 2-naphthoate, 2-hydroxy-3-naphthoate, 8-hydroxy-1-naphthoate, C$_1$-C$_4$-alkylsulfonate, such as methylsulfonate or ethylsulfonate, C$_1$-C$_4$-alkylsulfate such as methyl sulfate or ethyl sulfate, arylsulfonates, where the aryl ring is unsubstituted or optionally substituted by C$_1$-C$_4$-alkyl, C$_1$-C$_4$-alkoxy, NO$_2$, hydroxyl or halogen, such as benzene sulfonate, toluene sulfonate or naphthalin sulfonate.

The invention also relates to a process for making a polymer as described herein. The process may be performed either according to process 1 as described above or according to process 2 as described above.

According to process 1, the polyalkylene imine is reacted in a first step i) with an aromatic carboxylic acid or with an amide or imide forming derivative of an aromatic carboxylic acid, in such an amount that theoretically at most 90 mol-%, in particular at most 60 mol-%, e.g. 1 to 90 mol-%, in particular 10 to 60 mol-%, based on the total amount of primary and secondary nitrogen atoms of the polyalkylene imine, can be consumed. Thereby a polyalkylene imine is formed which bears at least one, e.g. on average 1 to 250, in particular 2 to 150 and especially 5 to 100 aromatic moieties P.1 per polymer molecule.

The reaction of step i) may be preformed in bulk or in an inert solvent. Inert solvents include aprotic organic solvents, such as aromatic hydrocarbons, such as toluene or xylenes, aliphatic esters, such as ethyl acetate, ethyl butyrate or butyl acetate, aliphatic or alicyclic ethers such as diethyl ether, diisopropyl ether or methyl tert.-butyl ether or tetrahydrofurane, and mixtures thereof. Preferably, the reaction is performed in bulk, i.e. in the absence of an organic solvent.

The reaction of step i) may be preformed by simply mixing the reactants and optionally warming the mixture until the desired conversion is achieved. Frequently, the reaction of step i) is performed at a temperature in the range from 20 to 100° C., in particular in the range from 30 to 80° C.

In step i) of process 1, the relative amount of the polyalkylene imine and the aromatic carboxylic acid or the amide or imide forming derivative of the aromatic carboxylic acid is generally such that theoretically at most 90 mol-%, in particular at most 60 mol-%, e.g. 1 to 90 mol-%, in particular 10 to 60 mol-%, of the total amount of primary and secondary nitrogen atoms of the polyalkylene imine, can be consumed. Preferably, the relative amount of the aromatic carboxylic acid or the amide or imide forming derivative of the aromatic carboxylic acid is from 10 to 200% by weight, in particular from 20 to 150% by weight, based on the weight of the polyalkylene imine used in step i) of process 1.

The reaction of step i) can be performed in the presence or the absence of a catalyst. Suitable catalysts include acidic catalysts, including Broenstedt acids and Lewis acids. Preferably, no catalyst is used in step i).

In the second step ii) of process 1 the product of step i) is reacted either with an aliphatic polyester, having a terminal carboxyl group, or with at least one monomer, which reacts with the polyalkylene imine by formation of at least one aliphatic polyester group P.2.

If the product of step i) is reacted with an aliphatic polyester, having a terminal carboxyl group, the terminal carboxyl group reacts with a primary or secondary amino group of the polyalkylene imine in an amidation reaction, thereby forming a carboxamide group. Thereby a polyalkylene imine is formed which in addition to the groups P.1 bears on average at least one, e.g. on average 1 to 400, in particular 5 to 250 and especially 10 to 150 aliphatic polyester moieties P.2 per polymer molecule.

Generally, the polyester is used in an amount of 50 to 98% by weight, in particular 7 to 97% by weight or from 80 to 96% by weight based on the total amount of the reactants of step ii), i.e. the total amount of the reaction product of step i) and the polyester. The weight ratio of the polyester to the polyalkylene imine used in step i) is generally in the range from 1:1 to 98:1, in particular from 2:1 to 97:1 or from 3:1 to 50:1.

If the product of step i) is reacted with least one monomer, which is capable of reacting with the polyalkylene imine by formation of at least one aliphatic polyester group P.2, the primary as well as the secondary amino groups of the polyalkylene imine will undergo amidation by the monomer and also act as starter for the polymerization of the monomers. Thereby a polyalkylene imine is formed which in addition to the groups P.1 bears on average at least one, e.g. on average 1 to 400, in particular 5 to 250 and especially 10 to 150 aliphatic polyester moieties P.2 per polymer molecule.

Generally, the polyester forming monomers are used in an amount of 50 to 98% by weight, in particular from 70 to 97% by weight or from 80 to 96% by weight based on the total amount of the reactants of step ii), i.e. the total amount of the reaction product of step i) and the polyester forming monomers. The weight ratio of the polyester forming monomers to the polyalkylene imine used in step i) is generally in the range from 1:1 to 98:1, in particular from 2:1 to 97:1 or from 3:1 to 50:1.

Irrespectively, of whether a polyester or polyester forming monomers are used in step ii), the reaction of step ii), i.e. the reaction of the intermediate of step i) with the aliphatic polyester or with the ester forming monomers may be preformed in bulk or in an inert solvent. Inert solvents include aprotic organic solvents, such as aromatic hydrocarbons, such as toluene or xylenes, aliphatic esters, such as ethyl acetate, ethyl butyrate or butyl acetate, aliphatic or alicyclic ethers such as diethyl ether, diisopropyl ether or methyl tert.-butyl ether or tetrahydrofurane, and mixtures thereof. Preferably, the reaction is performed in bulk, i.e. in the absence of an organic solvent.

The reaction of the intermediate of step i) with the aliphatic polyester may be preformed by simply mixing the reaction product of step i) and the polyester followed by heating the mixture until the desired conversion is achieved. Frequently, the reaction of step ii) is performed at a temperature in the range from 120 to 250° C., in particular in the range from 150 to 200° C. Salt formation of the terminal carboxyl group of the polyester with the amino groups of the polyalkylene imine may be a side reaction. Heating of the reaction mixture to temperature above 150° C. and removal of water will favor the amidation reaction. The reaction of the intermediate of step i) with the polyester forming monomers is principally performed under similar conditions.

Irrespectively of whether a polyester or polyester forming monomers are used, the reaction of step ii) can be performed in the presence or the absence of a catalyst. Suitable catalysts include acidic catalysts, including Broenstedt acids and Lewis acids. Preferably, no catalyst is used in step ii).

Process 2 is a single-step process which combines steps i) and ii) of process 1 to a single reaction step. Hence, process 2 comprises reacting a polyalkylene imine with an aromatic carboxylic acid or with an amide or imide forming derivative of an aromatic carboxylic acid and also with at least one monomer, which reacts with the polyalkylene imine by formation of at least one aliphatic polyester group P.2 as explained for step ii) of process 1. Like process 1, a polyalkylene imine polymer is formed in process 2, which bears both moieties P.1 and P.2 as described above.

Preferably, the relative amount of the aromatic carboxylic acid or the amide or imide forming derivative of the aromatic carboxylic acid is from 10 to 200% by weight, in particular from 20 to 150% by weight, based on the weight of the polyalkylene imine used in step i') of process 2. Generally, the polyester forming monomers are used in an amount of 50 to 98% by weight, in particular from 70 to 97% by weight or from 80 to 96% by weight based on the total amount of the reactants of step i'), i.e. the total amount of polyalkylene imine, the aromatic carboxylic acid or the amide or imide forming derivative of the aromatic carboxylic and the polyester forming monomers. The weight ratio of the polyester forming monomers to the polyalkylene imine is generally in the range from 1:1 to 98:1, in particular from 2:1 to 97:1 or from 3:1 to 50:1.

Irrespectively of whether a polyester or polyester forming monomers are used in step ii), the reaction of step ii), i.e. the reaction of the intermediate of step i) with the aliphatic polyester or with the ester forming monomers may be preformed in bulk or in an inert solvent. Inert solvents include aprotic organic solvents, such as aromatic hydrocarbons, such as toluene or xylenes, aliphatic esters, such as ethyl acetate, ethyl butyrate or butyl acetate, aliphatic or alicyclic ethers such as diethyl ether, diisopropyl ether or methyl tert.-butyl ether or tetrahydrofurane, and mixtures thereof. Preferably, the reaction is performed in bulk, i.e. in the absence of an organic solvent.

Process 2 may be preformed by simply mixing the reactants, e.g. the polyalkylene imine, the ester forming monomers and the aromatic carboxylic acid or the amide or imide forming derivative of the aromatic carboxylic followed by heating the mixture until the desired conversion is achieved. Frequently, the reaction of step i) is performed at a temperature in the range from 20 to 250° C., in particular in the range from 30 to 200° C. It has been found beneficial to conduct the reaction first at a lower temperature and than at higher temperatures. Preferably, the reaction is first conducted at a temperature as described for step i) of process 1, in particular at a temperature in the range from 30 to 80° C., followed by reaction at higher temperature, e.g. in the range from 120 to 250° C., in particular in the range from 150 to 200° C.

The reaction of process 2 can be performed in the presence or the absence of a catalyst. Suitable catalysts include acidic catalysts, including Broenstedt acids and Lewis acids. Preferably, no catalyst is used in process 2.

Like in process 1, process 2 yields a polyalkylene imine which bears at least one, e.g. on average 1 to 250, in particular 2 to 150 and especially 5 to 100 aromatic moieties P.1 per polymer molecule, and also, on average, at least one, e.g. on average 1 to 400, in particular 2 to 250 and especially 10 to 100 aliphatic polyester moieties P.2 per polymer molecule.

In the context of process 1 as well as in the context of process 2, suitable amide or imide forming derivative of an aromatic carboxylic acid are the anhydrides and $C_1$-$C_4$-alkyl esters, in particular the anhydrides of the aromatic carboxylic acids.

Preferably, an amide or imide forming derivative (I) of an aromatic carboxylic acid is used in process 1 as well as in process 2

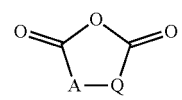
(I)

wherein
Q is a chemical bond or a divalent moiety selected from —O—, —NH— and —S—, and wherein Q is in particular O or a chemical bond;
A is a unsubstituted or substituted aromatic group selected from the group consisting of 1,2-phenylen, 1,2-naphthylen, 2,3-naphthylen or 1,8-naphthylen, wherein phenylen and naphthylen each independently are unsubstituted or carry 1, 2, 3 or 4 radicals R, in particular 0 or 1 radical R, where R are identical or different and independently of each other are selected from halogen, OH, $C_1$-$C_4$-alkyl, $C_1$-$C_4$-alkoxy, COOH, $CONH_2$, $NH_2$, $NO_2$, NH—CHO, NH—$C_1$-$C_4$-alkyl, and NH—(C=O)—$C_1$-$C_4$-alkyl and where R is in particular selected from the group consisting of Cl, $NH_2$, $NO_2$, COOH, NH—CHO, NH—$CH_3$, and NH—(C=O)—$CH_3$.

In the context of formula (I), A is in particular a radical of the formulae

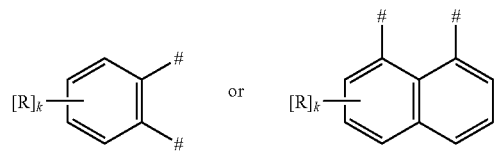

wherein # indicates the point of attachment to the rest of the molecule, and
k is 0, 1, 2, 3 or 4, in particular 0 or 1
R is independently or identical selected from the group consisting halogen, OH, $C_1$-$C_4$-alkyl, $C_1$-$C_4$-alkoxy, COOH, $CONH_2$, $NH_2$, $NO_2$, NH—CHO, NH—$C_1$-$C_4$-alkyl, and NH—(C=O)—$C_1$-$C_4$-alkyl, and wherein R is in particular selected from the group consisting of Cl, $NH_2$, $NO_2$, COOH, NH—CHO, NH—$CH_3$, and NH—(C=O)—$CH_3$.

In the context of formulae P.1', P.1", the substituents on phenylene or naphthylene, if present, are in particular selected from the group consisting of Cl, $NH_2$, $NO_2$, COOH, NH—CHO, NH—$CH_3$, and NH—(C=O)—$CH_3$.

In particular, an amide or imide forming derivative of an aromatic carboxylic acid is used in process 1 as well as in process 2, which is selected form compounds of formulae (Ia), (Ib) and (Ic):

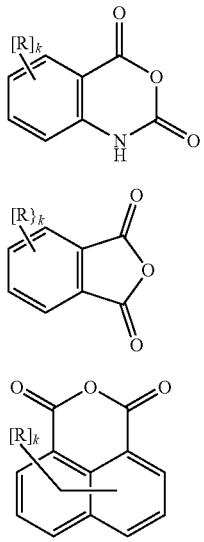

(Ia)

(Ib)

(Ic)

wherein k is 0, 1, 2, 3 or 4, in particular 0 or 1

R is independently or identical selected from the group consisting halogen, OH, $C_1$-$C_4$-alkyl, $C_1$-$C_4$-alkoxy, COOH, $CONH_2$, $NH_2$, $NO_2$, NH—CHO, NH—$C_1$-$C_4$-alkyl, and NH—(C=O)—$C_1$-$C_4$-alkyl, and wherein R is in particular selected from the group consisting of Cl, $NH_2$, $NO_2$, COOH, NH—CHO, NH—$CH_3$, and NH—(C=O)—$CH_3$.

In step i) of process 1 either an aliphatic polyester or monomers, which are capable of forming an aliphatic polyester are used. Preference is given to processes 1 and 2, where instead of a preformed polyester at least one ester forming monomer are used.

In the context of processes 1 and 2, suitable ester forming monomers are in particular an aliphatic lactone of formula (II) or a mixture of aliphatic lactones of the formula (II) or a mixture of at least one aliphatic lactone of the formula (II) with a fatty acid of formula (III).

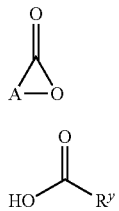

(II)

(III)

In formulae (II) and (III) A and $R^y$ have the following meanings:

A is independently from each other linear $C_2$-$C_8$-alkylene, in particular linear $C_3$-$C_6$-alkylene, which is unsubstituted or carries 1, 2, 3, or 4 $C_1$-$C_4$-alkyl radicals, and $R^y$ is $C_1$-$C_{20}$-alkyl or $C_2$-$C_{20}$-alkenyl, wherein $C_1$-$C_{20}$-alkyl and $C_2$-$C_{20}$-alkenyl are unsubstituted or carry 1 or 2 OH groups, wherein $C_2$-$C_{20}$-alkenyl has 1, 2, 3 or 4 olefinic C=C-double bonds, and wherein 1, 2, 3, or 4 non-adjacent $CH_2$ groups of $C_1$-$C_{20}$-alkyl may be replaced by O.

In formula (II), the variable A preferably has the following meaning:

A is linear $C_3$-$C_6$-alkylene, more particularly 1,4-butandiyl or 1,5-pentandiyl or a combination thereof, and especially a combination of 1,4-butandiyl and 1,5-pentandiyl having a molar ratio of 1,4-butandiyl and 1,5-pentandiyl in the range of 1:20 to 10:1.

The aliphatic lactone of formula (II) is in particular caprolactone, valerolactone or a mixture thereof, in particular a mixture, where the weight ratio of caprolactone to valerolactone is in the range from 1:10 to 20:1.

In formula (III), the variable $R^y$ preferably has the following meaning:

$R^y$ is C(=O)—$C_6$-$C_{20}$-alky or C(=O)—$C_6$-$C_{20}$-alkenyl, wherein $C_6$-$C_{20}$-alkyl and $C_6$-$C_{20}$-alkenyl are unsubstituted or carry 1 or 2 OH groups and where $R^y$ is especially C(=O)—$C_{10}$-$C_{20}$-alky or C(=O)—$C_{10}$-$C_{20}$-alkenyl, wherein $C_{10}$-$C_{20}$-alkyl and $C_{10}$-$C_{20}$-alkenyl are unsubstituted or carry 1 or 2 OH groups.

If a polyester having a terminal carboxyl group is used in step ii) of process 1, the polyester is preferably a polymer which can be described by the following formula Preferably, the moiety P.2 is a radical of the formula (IV):

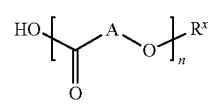

(IV)

wherein n is a number in the range of 2 to 100, in particular in the range of 3 to 50, especially in the range of 4 to 25;

A is independently from each other linear $C_2$-$C_8$-alkylene, in particular linear $C_3$-$C_6$-alkylene, where alkylene is unsubstituted or carries 1, 2, 3, or 4 $C_1$-$C_4$-alkyl radicals, and $R^x$ is hydrogen, $C_1$-$C_{20}$-alkyl, $C_2$-$C_{20}$-alkenyl, C(=O)—$C_2$-$C_{20}$-alkenyl or C(=O)—$C_1$-$C_{20}$-alkyl, wherein $C_1$-$C_{20}$-alkyl and $C_2$-$C_{20}$-alkenyl in the last four radicals are unsubstituted or carry 1 or 2 OH groups, wherein $C_2$-$C_{20}$-alkenyl has 1, 2, 3 or 4 olefinic C=C-double bonds, and wherein 1, 2, 3, or 4 non-adjacent $CH_2$ groups of $C_1$-$C_{20}$-alkyl may be replaced by O.

The variables A and $R^x$ in formula (IV) have in particular the following meanings:

A is linear $C_3$-$C_6$-alkylene, more particularly 1,4-butandiyl or 1,5-pentandiyl or a combination thereof, and especially a combination of 1,4-butandiyl and 1,5-pentandiyl having a molar ratio of 1,4-butandiyl and 1,5-pentandiyl in the range of 1:20 to 10:1;

$R^x$ is hydrogen, C(=O)—$C_6$-$C_{20}$-alky or C(=O)—$C_6$-$C_{20}$-alkenyl, wherein $C_6$-$C_{20}$-alkyl and $C_6$-$C_{20}$-alkenyl are unsubstituted or carry 1 or 2 OH groups and where $R^x$ is especially C(=O)—$C_{10}$-$C_{20}$-alky or C(=O)—$C_{10}$-$C_{20}$-alkenyl, wherein $C_{10}$-$C_{20}$-alkyl and $C_{10}$-$C_{20}$-alkenyl are unsubstituted or carry 1 or 2 OH groups.

These polyesters can be produced by the processes described in the art cited in the introductory part, e.g. in EP 208041, WO 94/21368, WO 98/19784 and WO 01/21298. Theses processes include a polymerization of suitable polyester forming monomers, e.g. by polymerization of at least one aliphatic lactone of the formula (II) or by polymerization of a mixture of at least one aliphatic lactone of the formula (II) with a fatty acid of formula (III) as described above.

The formation of the preformed polyester, e.g. the polyester of formula (IV) can be simply achieved by heating the ester forming monomers, e.g. at least one aliphatic lactone of the formula (II) or a mixture of at least one aliphatic lactone of the formula (II) with a fatty acid of formula (III) to a temperature where polymerization takes place. Optionally water is removed, if necessary. The polymerization can be catalyzed by suitable esterification catalysts. Preferably an acidic catalyst is used. Suitable acidic catalysts include Broenstedt acids and Lewis acids. Suitable Broenstedt catalysts include but are not limited to organic sulfonic acids, e.g. alkylsulfonic acids such as methyl or ethylsulfonic acid or arylsulfonic acid such as phenylsulfonic acid or toluenesulfonic acid. Suitable Lewis acids include ortho esters of titanium(IV) acid (ortho titanaates), such as titanium(IV) tetraethylate, titanium(IV)tetrapropylate, titanium(IV)tetrabutylate, and tin(IV) compounds, such as dialkyltin(IV) alkanoates, such as dibutyltin dilaurate. The amount of catalyst is frequently in the range from 0.05 to 2% by weight, in particular from 0.1 to 1% by weight, based on the total weight of the reactants. The preparation of the preformed polyester is preferably carried out at a temperature in the range from 120 to 250° C., in particular in the range from 150 to 200° C.

Both processes 1 and 2 may comprise a further, subsequent step iii), where the product of steps ii) or i'), respectively, is quaternized or protonated.

Protonation can be simply achieved by reacting the polymer of the present invention, in particular the products obtained in step ii) of process 1 or the product of process 2 with a suitable amount of a Broenstedt acid to achieve the desired degree of protonation.

Suitable acids include hydrogen halides, such as hydrogen chloride or hydrogen bromide, sulfuric acid, alkanoic acids, such as acetic acid or propionic acids, arylcarboxylic acids, where the aryl ring is unsubstituted or optionally substituted by $C_1$-$C_4$-alkyl, $C_1$-$C_4$-alkoxy, $NO_2$, hydroxyl or halogen, such as benzoic acid, $C_1$-$C_4$-alkylbenzoic acid, 2-hydroxybenzoic acid, 4-hydroxybenzoic acid, 1-naphthoic acid, 2-naphthoic acid, 2-hydroxy-3-naphthoic acid, 8-hydroxy-1-naphthoic acid, $C_1$-$C_4$-alkylsulfonic acid, such as methylsulfonic acid or ethylsulfonic acid, arylsulfonatic acids, where the aryl ring is unsubstituted or optionally substituted by $C_1$-$C_4$-alkyl, $C_1$-$C_4$-alkoxy, $NO_2$, hydroxyl or halogen, such as benzene sulfonic acid, toluene sulfonic acid or naphthalin sulfonic acid.

Protonation may be performed in bulk or in an inert organic solvent. Suitable inert solvents include aprotic organic solvents, such as aromatic hydrocarbons, such as toluene or xylenes, aliphatic esters, such as ethyl acetate, ethyl butyrate or butyl acetate, aliphatic or alicyclic ethers such as diethyl ether, diisopropyl ether or methyl tert.-butyl ether or tetrahydrofurane, and mixtures thereof. Preferably, the protonation is performed in bulk, i.e. in the absence of an organic solvent. Protonation may frequently be carried out at a temperature in the range from 20 to 150° C., in particular in the range from 40 to 120° C.

Quaternization can be achieved by reacting the polymer of the present invention, in particular the products obtained in step ii) of process 1 or the product of process 2 with a suitable amount of quaternizing agent to achieve the desired degree of protonation. Quaternization can be achieved by analogy to conventional methods of quaternizing amino groups in polymers, e.g. as described in US 2010/0022662, in particular in § 0098 and for Wetting and Dispersing Agents 4 to 6.

Suitable quaternizing agents include compounds of the formula $R^{kk}$-L, where $R^{kk}$ represents an optionally substituted hydrocarbon radical such as alkyl, aryl, arylalkyl or cycloalkyl, and L represents a leaving group.

Frequently, $R^{kk}$ is selected from the group consisting of
$C_1$-$C_{20}$-alkyl, which is unsubstituted or carries 1 or 2 OH groups and wherein 1, 2, 3, or 4 non-adjacent $CH_2$ groups of $C_1$-$C_{20}$-alkyl may be replaced by O;
$C_2$-$C_{20}$-alkenyl, which has 1, 2, 3 or 4 olefinic C=C-double bonds and which is unsubstituted or carries 1 or 2 OH groups,
aryl, such as phenyl or naphthyl, where the aryl part is unsubstituted or carries 1, 2, 3, 4 or 5 substituents, which are selected from the group consisting of halogen, OH, $NO_2$, COOH, $C_1$-$C_4$-alkyl, $C_1$-$C_4$-alkoxy, $CONH_2$, NH—CHO, and NH—(C=O)—$C_1$-$C_4$-alkyl, and
aryl-$CH_2$, such as benzyl, 1-naphthylmethyl or 2-naphthylmethyl, where the aryl part is unsubstituted or carries 1, 2, 3, 4 or 5 substituents, which are selected from the group consisting of halogen, OH, $NO_2$, COOH, $C_1$-$C_4$-alkyl, S—$C_1$-$C_4$-alkyl, $S(O)_2$—$C_1$-$C_4$-alkyl, $C_1$-$C_4$-alkoxy, $CONH_2$, NH—CHO, and NH—(C=O)—$C_1$-$C_4$-alkyl.

In particular $R^{kk}$ is selected from the group consisting of
$C_1$-$C_{10}$-alkyl, which is unsubstituted or carries 1 or 2 OH groups;
benzyl, where the phenyl ring part is unsubstituted or carries 1, 2 or 3 substituents, which are selected from the group consisting of halogen, OH, $NO_2$, $C_1$-$C_4$-alkyl and $C_1$-$C_4$-alkoxy.

Suitable leaving groups include halide, such as chloride, bromide or iodide, and $C_1$-$C_4$-alkylsulfates such as methyl sulfate or ethyl sulfate.

Quaternization may be performed in bulk or in an inert organic solvent. Suitable inert solvents include aprotic organic solvents, such as aromatic hydrocarbons, such as toluene or xylenes, aliphatic esters, such as ethyl acetate, ethyl butyrate or butyl acetate, aliphatic or alicyclic ethers, such as diethyl ether, diisopropyl ether or methyl tert.-butyl ether or tetrahydrofurane, halogenated hydrocarbons, such as dichloromethane, dichloroethane and mixtures thereof.

Quaternization may frequently be carried out at a temperature in the range from 40 to 200° C., in particular in the range from 50 to 160° C.

The present invention also relates to the use of the polymers or the salts thereof, as described herein, in particular of the products, which are obtainable by one of the processes 1 or 2, in liquid pigment compositions, in particular in an liquid concentrate pigment composition, i.e. in pigment pastes, millbases or colorants, which can be used for tinting or coloring coating compositions, in particular for coloring liquid paint systems. The polymers are suitable both for aqueous and solvent borne coating compositions, with particular preference given to solvent borne coating compositions. The present invention also relates to the use of the polymers or the salts thereof, as described herein, in particular of the products, which are obtainable by one of the processes 1 or 2, in inks.

The present invention also relates to liquid pigment compositions, comprising at least one polymer as described herein, in particular a polymer, which are obtainable by one of the processes 1 or 2, a pigment material and a liquid diluent.

The term "pigment materials", as used herein, includes both pigments and fillers. In the pigment composition of the invention, the pigment material is in particular selected from the group consisting of pigments and mixtures of at least one pigment and at least one filler. Pigments include organic pigments, inorganic pigments and luster pigments/perlescent flakes.

Examples of suitable organic pigments include azo pigments, disazo pigments, naphthol pigments, benzimidazolone pigments, disazocondensation pigments, metal complex pigments, isoindolinone pigments, isoindoline pigments, the chinophthalon pigments, dioxazine pigments and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthanthrones, isoviolanthrones, diketopyrrolopyrrole, and carbazoles, e.g. carbazole violet, and the like. Further examples of organic pigments can be found in the monograph: W. Herbst, K. Hunger "*Industrielle Organische Pigmente*" 2$^{nd}$ Edition, 1995, VCH Verlagsgesellschaft, ISBN: 3-527-28744-2.

Representative examples of organic pigments are:

Monoazo pigments: C.I. Pigment Yellow 1, 3, 62, 65, 73, 74, 97, 183 and 191; C.I. Pigment Orange 5, 38 and 64; C.I. Pigment Red 1, 2, 3, 4, 5, 23, 48:1, 48:2, 48:3, 48:4, 49, 49:1, 51, 51:1, 52:1, 52:2, 53, 53:1, 53:3, 57:1, 58:2, 58:4, 63, 112, 146, 148, 170, 184, 187, 191:1, 210, 245, 247 and 251;

Disazo pigments: C.I. Pigment Yellow 12, 13, 14, 16, 17, 81, 83, 106, 113, 126, 127, 155, 170, 174, 176 and 188; C.I. Pigment Orange 16, 34 and 44;

Disazocondensation pigments: C.I. Pigment Yellow 93, 95 and 128; C.I. Pigment Red 144, 166, 214, 220, 221, 242 and 262; C.I. Pigment Brown 23 and 41;

Anthanthrone pigments: C.I. Pigment Red 168;

Anthrachinone pigments: C.I. Pigment Yellow 147 and 199; C.I. Pigment Red 177;

Anthrapyrimidine pigments: C.I. Pigment Yellow 108;

Benzimidazolone pigments: C.I. Pigment Yellow 120, 151, 154, 180, 181; C.I. Pigment Orange 36 and 72, C.I. Pigment Red 175, 185, 208; C.I. Pigment Brown 25; C.I. Pigment Violet 32;

Chinacridone pigments: C.I. Pigment Orange 48 and 49; C.I. Pigment Red 122, 202, 206 and 209; C.I. Pigment Violet 19;

Chinophthalone pigments: C.I. Pigment Yellow 138;

Diketopyrrolopyrrolpigmente: C.I. Pigment Orange 71, 73 and 81; C.I. Pigment Red 254, 255, 264, 270 and 272;

Dioxazine pigments: C.I. Pigment Violet 23;

Flavanthrone pigments: C.I. Pigment Yellow 24;

Indanthrone pigments: C.I. Pigment Blue 60 and 64;

Isoindoline pigments: C.I. Pigment Yellow 139 and 185; C.I. Pigment Orange 61 and 69, C.I. Pigment Red 260;

Isoindolinone pigments: C.I. Pigment Yellow 109, 110 and 173;

Isoviolanthrone pigments: C.I. Pigment Violet 31;

Metalcomplex pigments: C.I. Pigment Red 257; C.I. Pigment Yellow 117, 129, 150, 153 and 177; C.I. Pigment Green 8;

Perinone pigments: C.I. Pigment Orange 43; C.I. Pigment Red 194;

Perylene pigments: C.I. Pigment Red 123, 149, 178, 179 and 224; C.I. Pigment Violet 29; C.I. Pigment Black 31 and 32;

Phthalocyanin pigments: C.I. Pigment Blue 15, 15:1, 15:2, 15:3, 15:4, 15:6, 16; C.I. Pigment Green 7, 36;

Pyranthrone pigments: C.I. Pigment Orange 51; C.I. Pigment Red 216;

Pyrazolochinazolone pigments: C.I. Pigment Orange 67 and C.I. Pigment Red 216;

Thioindigo pigments: C.I. Pigment Red 88 and 181; C.I. Pigment Violet 38;

Triarylcarbonium pigments: C.I. Pigment Red 81, 81:1 and 169; C.I. Pigment Violet 1, 2, 3 and 27; C.I. Pigment Blue 1, 61 and 62; C.I. Pigment Green 1;

C.I. Pigment Black 1 (Aniline black);

C.I. Pigment Yellow 101 (Aldazine yellow);

C.I. Pigment Brown 22.

Suitable inorganic pigments are e.g.

white pigments, such as titanium dioxide (C.I. Pigment White 6) including crystal forms or modifications thereof, such as rutil or anatas, zinc oxide, zinc sulphide, zinc phosphate, lithopone;

black pigments: iron oxide black (C.I. Pigment Black 11), iron-manganese black, spinel black (C.I. Pigment Black 27); carbon black (C.I. Pigment Black 7); graphite (C.I. Pigment Black 10); chromium-iron-black (P.Brown 29);

inorganic colored pigments: chrome oxide, chrome oxide hydrate green; chrome oxide green (C.I. Pigment Green 48); cobalt green (C.I. Pigment Green 50); ultramarine greene; cobalt blue (C.I. Pigment Blue 28 und 36; C.I. Pigment Blue 72); ultramarine blue; blue manganese; ultramarine violet; cobalt- and manganese violet; red iron oxide (C.I. Pigment Red 101); cadmium sulfoselenides (C.I. Pigment Red 108); cerium sulfide (C.I. Pigment Red 265); molybdenum red (C.I. Pigment Red 104); ultramarine red; brown iron oxide (C.I. Pigment Brown 6 und 7), mixed brown, spinel phases and corundum phases (C.I. Pigment Brown 29, 31, 33, 34, 35, 37, 39 und 40), chromium titanium yellow (CI Pigment Brown 24), chrome orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164 und 189); Chromium titanium yellow; Spinel phases (CI Pigment Yellow 119); Cadmium sulfide and cadmium zinc sulfide (CI Pigment Yellow 37 and 35); Chrome yellow (CI Pigment Yellow 34); Bismuth vanadate (CI Pigment Yellow 184).

The luster pigments are single-phase or multi-phase construction lamellar pigments whose color play is characterized by the interplay of interference, reflection and absorption phenomena. Examples are aluminum platelets and one or more times, especially of metal oxides coated aluminum, iron oxide and mica platelets.

Suitable fillers are calcium carbonate, such as natural and precipitated chalksilicon dioxides, such as quartz powder and transparent silicon dioxide, silicates, talc, kaolin, natural and synthetic mica, barium sulphate, metal oxides and hydroxides, such as aluminium oxide and aluminium hydroxide.

The size of the pigment material is preferably in the micrometer range, e.g. the weight average particle diameter may range from 0.1 µm to 500 µm, in particular form 0.2 µm to 100 µm or from 0.5 µm to 50 µm. The weight average particle diameter is usually determined by light scattering methods, e.g. by the method of ISO 13320:2009. The weight average particle diameter may be also be determined by sieving analysis.

Generally, the liquid pigment compositions of the invention contain 1 to 70% by weight, in particular 5 to 50% by weight, based on the total weight of the composition, of the pigment component.

In the aqueous pigment composition of the invention the weight ratio of pigment component to mono- or polynuclear melamine compound, calculated in each case as solids, is frequently in the range from 100:1 to 1:50, in particular from 30:1 to 1:10, more particularly in the range from 20:1 to 1:5, especially in the ranger from 10:1 to 1:2. The concentration of the polymer of the invention, calculated as solids and based on the total weight of the composition, is generally in the range from 0.5 to 50% by weight, in particular from 1 to 30% by weight or from 2 to 20% by weight.

The diluent present in the aqueous pigment composition of the invention will depend on the field of application in a known manner. Suitable diluents include water, organic solvents, such as $C_1$-$C_6$ alkanols, e.g. methanol, ethanol, isopropanol, propanol or n-butanol, ketones, such as di-$C_1$-$C_4$-alkyl ketones, such as acetone, methylethyl ketone, diethylketone, cyclic ketones, such as cyclohexanone, esters of aliphatic acids, in particular of acetic acid, such as ethyl acetate, butyl acetate, methoxyethyl acetate, methoxypropyl acetate, aromatic hydrocarbons, such as toluene, xylenes, and aromatic distillates, aromatic ethers, such as anisole, glycol ethers like butyl glycol, or methoxypropylene glycol. Mixtures of water and organic solvents, which are miscible with water, such as $C_1$-$C_4$ alkanols, e.g. methanol, ethanol, isopropanol, propanol or n-butanol, ketones, such as di-$C_1$-$C_2$-alkyl ketones, such as acetone, methylethyl ketone, diethylketone, cyclic ketones, such as cyclohexanone, glycol ethers like butyl glycol, or methoxypropylene glycol, may also be used as a diluent.

For preparing the pigment composition of the invention, the pigment component is usually dispersed in the liquid diluent in the presence of the at least one polymer of the invention. The dispersion can be achieved by using conventional techniques, such as high speed mixing, ball milling, sand grinding, attritor grinding or two or three roll milling. The resulting pigment composition may have a pigment to dispersant weight ratio in the above range.

Depending on the intended use, the pigment composition may further comprise one or more conventional additives depending on the intended use. Conventional additives included e.g. rheology additives, non-ionic dispersants, flow auxiliaries, defoamers, pigment synergists, preservatives, and the like.

The pigment composition is frequently formulated as a pigment paste. Such a pigment paste contains the pigment component, the dispersant composition of the invention and an aqueous diluent and optionally additives but generally it will not contain binders.

The pigment compositions of the invention provide for good application properties, such as high color strength, good dispersability in a multitude of liquid compositions. They are particularly useful for tinting solvent borne coating compositions. The resulting paints have good gloss and show low cratering. The coating compositions may also have high color strength and may not show color change in the rub out-test, as described in DE 2202527.

Suitable coating compositions which can be colored with the pigment compositions of the invention include architectural coatings, industrial coatings, automotive coatings, radiation-curable coatings; paints, including paints for building exteriors and building interiors, for example wood paints, lime washes, distempers and emulsion paints. They can also be sued for coloring printing inks, for example offset printing inks, flexographic printing inks, toluene gravure printing inks, textile printing inks, radiation-curable printing inks; waterborne inks, including inkjet inks and color filters.

As explained above, the pigment composition may be included into a coating composition. Such a coating composition contains the pigment component, the at least one polymer of the invention, a liquid diluent and additionally one or more binders, e.g. film-forming polymers or prepolymers which form a film upon curing. Coating composition may optionally contain conventional additives conventionally used in coating technology, e.g. plasticisers, lubricants, emulsifiers, rheology additives, catalysts, flow auxiliaries, optical brighteners, flame retardants, preservatives, antistatic agents or blowing agents.

Suitable binders are the ones customarily used, for example the ones described in *Ullmann's Encyclopedia of Industrial Chemistry*, 5th Edition, Vol. A18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air-drying resins can be used. Binders may also be derived from polyvinylalcohol and polyvinylbutyral.

If cold- or hot-curable binders are used, the addition of a curing catalyst may be advantageous. Suitable catalysts that accelerate the curing of binders are described, for example, in Ullmann's, Vol. A18, loc. cit., p. 469.

Examples of coating compositions containing cold- or hot-curable binders are:

Paints based on cold- or hot-cross linkable alkyd, acrylate, polyester, epoxy or melamine resins or mixtures of such resins, if desired with addition of a curing catalyst;

Two-component polyurethane paints based on hydroxyl-containing acrylate, polyester or polyether resins and aliphatic or aromatic isocyanates, isocyanurates or polyisocyanates;

One-component polyurethane paints based on blocked isocyanates, isocyanurates or polyisocyanates which are deblocked during baking, if desired with addition of a melamine resin;

One-component polyurethane paints based on a tri-salkoxycarbonyl triazine cross linker and a hydroxyl group containing resin, such as acrylate, polyester or polyether resins;

One-component polyurethane paints based on aliphatic or aromatic urethane acrylates or polyurethane acrylates having free amino groups within the urethane structure and melamine resins or polyether resins, if necessary with curing catalyst;

Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly) oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

The invention is hereinafter also described by way of examples.

EXAMPLES

Starting Materials

Polyethyleneimine 1: Branched polyethyleneimine having a Mw of 2000 g/mol (Lupasol® PR8515 of BASF SE, Ludwigshafen, Germany)

Polypropylenimine 1: Branched polypropyleneimine having a Mw of 1700 g/mol (Sigma Aldrich)

Methods

Amine Number

The amine number was determined according to DIN 53176:2002-11.

Acid Number

The acid number was determined according to DIN 53402:1990-09.

Viscosity

Viscosity was determined by analogy to DIN 53019-1: 2008-09, using a Thermo-Haake RheoStress 600 equipment under the CR mode at 22° C. and a shear rate of 1 sec$^{-1}$ (Spindle CP50).

Gloss:

The gloss of the obtained coatings at 20° angle was determined according to DIN 67530/DIN EN ISO 2813: 2012-10 using a commercial reflectometer (Micro-Tri-Gloss reflectometer from BYK Gardner).

Synthesis

Dispersant A (Comparative example according to example 67 of WO 2007/110333)

A mixture of 6.45 g of polyethyleneimine 1, 85 g ε-caprolactone, 15 g γ-valerolactone, 15 g 12-hydroxystearic acid and 0.12 g dibutyltin dilaurate (DBTL) was stirred at 180° C. under $N_2$ gas for 12 hr. Thereby, a viscous liquid having an amine number of 26 mgKOH/g and acid number of 15 mgKOH/g was obtained.

The obtained product was a polyethyleneimine (PEI) which bears copolyester groups made of ε-caprolactone, γ-valerolactone, and 12-hydroxystearic acid the copolyester groups being attached to the PEI predominantly via carboxamide groups.

Intermediate 1

A mixture of 100 g polyethyleneimine 1 and 90 g 1,8-naphthalic anhydride was stirred at 40° C. until the acid number was less than 30 mgKOH/g.

The obtained product was a polyethyleneimine (PEI) which bears radicals of formulae P.1c and P1e with k=0, which are attached to the PEI predominantly via carboxamide and carboximide groups, respectively.

Intermediate 2

A mixture of 100 g polyethyleneimine 1 and 40 g isatoic anhydride was stirred at 40° C. until no more gas ($CO_2$) was formed. Thereby, a viscous liquid with an amine number of 1050 mgKOH/g was obtained.

The obtained product was a polyethyleneimine (PEI) which bears groups of formula P.1a, with k=0, which are attached to the PEI predominantly via carboxamide groups.

Intermediate 3

A mixture of 10 g lauric acid (0.05 mol), 60 g ε-caprolactone (0.5 mol), 20 g γ-valerolactone (0.25 mol), and 0.5 g titanium (IV) butylate catalyst was stirred at 170° C. until the solid content was higher than 97%. Thereby, a yellowish liquid with an acid number of 32 mgKOH/g was obtained.

The obtained product was a copolyester of ε-caprolactone and γ-valerolactone with a lauric acid terminus having a number average weight of about 1800 g/mol.

Dispersant 1

A mixture of 10 g intermediate 1 and 100 g intermediate 3 was stirred at 180° C. under $N_2$ gas for 12 hr. Thereby, a yellowish liquid with an amine number of 25 mgKOH/g and acid number of 10 mgKOH/g was obtained.

The obtained product was a polyethyleneimine (PEI) which bears radicals of formulae P.1c and P1e with k=0, which are attached to the PEI predominantly via carboxamide and carboximide groups and which bears copolyester side chains of ε-caprolactone, γ-valerolactone and lauric acid.

Dispersant 2

A mixture of 10 g intermediate 2 and 100 g intermediate 3 was stirred at 180° C. under $N_2$ gas for 12 hr. Thereby, a yellowish liquid having an amine number of 51 mgKOH/g and acid number of 10 mgKOH/g was obtained.

The obtained product was a polyethyleneimine (PEI) which bears groups of formula P.1a, with k=0, which are attached to the PEI predominantly via carboxamide groups and which bears copolyester side chains of ε-caprolactone, γ-valerolactone with a lauric acid terminus.

Dispersant 3

A mixture of 8 g polyethyleneimine 1, 4 g 1,8-naphthalic anhydride, 100 g ε-caprolactone, 20 g γ-valerolactone and 10 g lauric acid was stirred at 100° C. until a homogenous mixture was obtained. Then, the mixture was heated up and stirred at 180° C. under $N_2$ gas for 12 hr. Thereby, a viscous liquid having an amine number of 28 mgKOH/g and acid number of 12 mgKOH/g was obtained.

The obtained product was a polyethyleneimine (PEI) which bears 1,8-naphthalic anhydride derivatives which are attached to the PEI predominantly via carboxamide and carboximine groups and which bears copolyester side chains of ε-caprolactone, γ-valerolactone having a lauric acid terminus.

Dispersant 4

A mixture of 8 g polyethyleneimine 1, 8 g 1,8-naphthalic anhydride, 60 g ε-caprolactone, 20 g γ-valerolactone and 10 g 12-hydroxystearic acid was stirred at 100° C. until a homogenous mixture was obtained. Then, the mixture was heated up and stirred at 180° C. under $N_2$ gas for 12 hr. Thereby, a viscous liquid with an amine number of 33 mgKOH/g and acid number of 9 mgKOH/g was obtained.

The obtained product was a polyethyleneimine (PEI) which bears radicals of formulae P.1c and P1e with k=0, which are attached to the PEI predominantly via carboxamide and carboximine groups and which bears copolyester side chains of ε-caprolactone, γ-valerolactone and 12-hydroxystearic acid.

Dispersant 5

A mixture of 8 g polyethyleneimine 1, 4 g isatoic anhydride, 70 g ε-caprolactone, 40 g γ-valerolactone and 15 g 12-hydroxystearic acid was stirred at 40° C. until no more gas ($CO_2$) was formed. Then the mixture was heated up to 180° C. under $N_2$ gas for 12 hr. Thereby, a viscous liquid with an amine number of 35 mgKOH/g and acid number of 10 mgKOH/g was obtained.

The obtained product was a polyethyleneimine (PEI) which bears radicals of formula P.1a with k=0, which are attached to the PEI predominantly via carboxamide groups and which bears copolyester side chains of ε-caprolactone, γ-valerolactone and 12-hydroxystearic acid.

Dispersant 6

A mixture of 8 g polyethyleneimine 1, 8 g isatoic anhydride, 60 g ε-caprolactone, 30 g γ-valerolactone and 10 g 12-hydroxystearic acid was stirred at 40° C. until there no more gas ($CO_2$) was formed. Then, the mixture was heated up and stirred at 180° C. under $N_2$ gas for 12 hr. Thereby, a viscous liquid with an amine number of 59 mgKOH/g and acid number of 7 mgKOH/g was obtained.

The obtained product was a polyethyleneimine (PEI) which bears radicals of formula P.1a with k=0, which are attached to the PEI predominantly via carboxamide groups and which bears copolyester side chains of ε-caprolactone, γ-valerolactone and 12-hydroxystearic acid.

Dispersant 7

A mixture of 8 g polyethyleneimine 1, 8 g isatoic anhydride, 80 g ε-caprolactone, 40 g γ-valerolactone and 20 g 12-hydroxystearic acid was stirred at 40° C. until no more gas ($CO_2$) was formed. Then, the mixture was heated up and stirred at 180° C. under $N_2$ gas for 12 hr. Thereby, a viscous liquid with an amine number of 35 mgKOH/g and acid number of 12 mgKOH/g was obtained.

The obtained product was a polyethyleneimine (PEI) which bears radicals of formula P.1a with k=0, which are attached to the PEI predominantly via carboxamide groups and which bears copolyester side chains of ε-caprolactone, γ-valerolactone and 12-hydroxystearic acid.

Dispersant 8

A mixture of 12 g polypropylenimine 1, 4 g isatoic anhydride, 80 g ε-caprolactone, 40 g γ-valerolactone and 15 g lauric acid was stirred at 40° C. until no more gas ($CO_2$) was formed. Then, the mixture was heated up and stirred at 180° C. under $N_2$ gas for 12 hr. Thereby, a viscous liquid with an amine number of 33 mgKOH/g and acid number of 15 mgKOH/g was obtained.

The obtained product was a polypropylenimine (PPI) which bears radicals of formula P.1a with k=0, which are attached to the PPI predominantly via carboxamide groups and which bears copolyester side chains of ε-caprolactone, γ-valerolactone and lauric acid.

Dispersant 9

A mixture of 8 g polyethyleneimine 1, 7 g phthalic anhydride, 60 g ε-caprolactone, 60 g γ-valerolactone and 20 g 12-hydroxystearic acid was stirred at 40° C. until no more gas ($CO_2$) was formed. Then, the mixture was heated up and stirred at 180° C. under $N_2$ gas for 12 hr. Thereby, a viscous liquid with an amine number of 20 mgKOH/g and acid number of 10 mgKOH/g was obtained.

The obtained product was a polyethyleneimine (PEI) which bears radicals of formulae P.1b and P.1d with k=0, which are attached to the PEI predominantly via carboxamide or carboximide groups, respectively and which bears copolyester side chains of ε-caprolactone, γ-valerolactone and 12-hydroxystearic acid.

Dispersant 10

A mixture of 8 g polyethyleneimine 2, 0 g 5-bromo-isatoic anhydride, 50 g ε-caprolactone, 60 g γ-valerolactone and 20 g 12-hydroxystearic acid was stirred at 40° C. until there no more gas ($CO_2$) was formed. Then the mixture was heated up and stirred at 180° C. under $N_2$ gas for 12 hr. Thereby, a viscous liquid with an amine number of 70 mgKOH/g and acid number of 15 mgKOH/g was obtained.

The obtained product was a polyethyleneimine (PEI) which bears radicals of formula P.1a with k=1, R=5-Br, which are attached to the PEI predominantly via carboxamide groups and which bears copolyester side chains of ε-caprolactone, γ-valerolactone and 12-hydroxystearic acid.

Dispersant 11

A mixture of 8 g polyethyleneimine 1, 7 g 4-nitro-1,8-naphthalic anhydride, 70 g ε-caprolactone, 50 g γ-valerolactone and 15 g lauric acid was stirred at 100° C. until a homogenous mixture was obtained. Then, the mixture was heated up and stirred at 180° C. under $N_2$ gas for 12 hr. Thereby, a viscous liquid having an amine number of 29 mgKOH/g and acid number of 10 mgKOH/g was obtained.

The obtained product was a polyethyleneimine (PEI) which bears formula P.1c and P.1e e with k=1 (R=⅘-$NO_2$), which are attached to the PEI predominantly via carboxamide and carboximine groups and which bears copolyester side chains of ε-caprolactone, γ-valerolactone having a lauric acid terminus.

Dispersant 12

A mixture of 7 g polyethyleneimine 1, 0 g 2,3-naphthalic anhydride, 80 g ε-caprolactone, 10 g γ-valerolactone and 10 g lauric acid was stirred at 100° C. until a homogenous mixture was obtained. Then, the mixture was heated up and stirred at 180° C. under $N_2$ gas for 12 hr. Thereby, a viscous liquid having an amine number of 31 mgKOH/g and acid number of 9 mgKOH/g was obtained.

The obtained product was a polyethyleneimine (PEI) which bears formula radicals of formulae P.1b and P.1d with k=0, which are attached to the PEI predominantly via carboxamide and carboximine groups and which bears copolyester side chains of ε-caprolactone, γ-valerolactone having a lauric acid terminus.

Performance Testing

In order to test the dispersion effect of the obtained samples, resin free pigment concentrates (millbase) were prepared according to the Formulation 1. The millbase was dispersed in Scandex Shaker for 1 hour with the help of glass beads. Afterwards the millbase was filtered and stored at room temperature overnight. The rheological behavior of the millbases was measured with a Thermo-Haake RheoStress 600 equipment under the CR mode at 22° C. and a shear rate of 1 sec$^{-1}$ (Spindle CP50).

Formulation 1. Preparation of Pigment Concentrates

| | | |
|---|---|---|
| 1) | Dispersant (100% solid) | 5.5 g |
| 2) | Methoxypropyl acetate | 25 g |
| 3) | Pigment: Carbon Black FW 171 | 5 g |
| 5) | 2.0 mm glass beads | 35 g |
| | Total | 70 g |

The performance of the dispersants was generally very good with low millbase viscosity (Table 1).

TABLE 1

Millbase viscosity (Viscosity @ 1 S$^{-1}$)

| Dispersant | mpas |
|---|---|
| A | 92000 |
| 1 | 2500 |
| 3 | 150 |

TABLE 1-continued

Millbase viscosity (Viscosity @ 1 S$^{-1}$)

| Dispersant | mpas |
|---|---|
| 5 | 100 |
| 6 | 50 |
| 7 | 1500 |
| 11 | 250 |

The paint was prepared by mixing 1.0 g millbase into 9.0 g let-down system (Formulation 2) via Dispermat for 2 minutes at 2000 rpm.

Formulations 2. Let-down systems

| CAB base coat | CAB 531-1 | 11.2 |
|---|---|---|
| | Butyl acetate | 51.9 |
| | Uracron CR 226 XB | 32.1 |
| | Uramex MF 821 | 4.8 |
| | Total | 100.0 |

CAB-531: cellulose acetate butyrate material commercially available from Eastman Chemical
Uracron CR 226 XB. DSM Coating Resins Uracron CR, OH acrylic
Uramex MF 821: DSM Coating Resins Uramex (amino)

The paint was applied on polyester film with a 150 μm film thickness. The gloss of the obtained coatings at 20° angle was determined according to DIN 67530 using a commercial reflectometer (Micro-Tri-Gloss reflectometer from BYK Gardner). The coatings were also assessed visually with regard to craters using a qualitative ranking from 1 (no visible craters) to 5 (many craters). The results are summarized in table 2.

TABLE 2

Gloss (20°) and crater ranking

| Dispersant | Gloss | Crater* |
|---|---|---|
| A | 65 | 3 |
| 1 | 66 | 2 |
| 3 | 67 | 2 |
| 5 | 70 | 1 |
| 6 | 71 | 1 |
| 7 | 67 | 1 |
| 11 | 68 | 1 |

As can be seen from the data in table 2, the performance of the polymers of the invention was generally very good with satisfactory results, e.g. high gloss and low cratering.

The invention claimed is:

1. A polymer having
   a) a polyalkyleneimine backbone;
   b) at least one aromatic moiety P.1, which is bound to a nitrogen atom of the polyalkyleneimine backbone via a carboxamide or carboximide group; and
   c) at least one aliphatic polyester moiety P.2, which is bound to a nitrogen atom of the polyalkyleneimine backbone via a carboxamide group.

2. The polymer of claim 1, wherein the moiety P.1 is a moiety of formulae (P.1') or (P.1")

(P.1')
[structure: #—C(=O)—Ar]

(P.1")
[structure: four-membered ring with two C=O groups, # attachment and Ar']

where
# indicates the point of attachment to a nitrogen atom of the polyalkyleneimine backbone,
Ar is phenyl or naphthyl, wherein phenyl and naphthyl, each independently are unsubstituted or carry 1, 2, 3, 4 or 5 radicals, which are selected from the group consisting of halogen, OH, $C_1$-$C_4$-alkyl, $C_1$-$C_4$-alkoxy, COOH, $CONH_2$, $NH_2$, $NO_2$, NH—CHO, NH—$C_1$-$C_4$-alkyl, and NH—(C=O)—$C_1$-$C_4$-alkyl,
Ar' is 1,2-phenylen, 1,2-, 2,3-, or 1,8-naphthylen, wherein phenylen and naphthylen, each independently are unsubstituted or carry 1, 2, 3, 4 or 5 radicals, which are selected from the group consisting of halogen, OH, $C_1$-$C_4$-alkyl, $C_1$-$C_4$-alkoxy, COOH, $CONH_2$, $NO_2$, $NH_2$, NH—CHO, NH—$C_1$-$C_4$-alkyl, and NH—(C=O)—$C_1$-$C_4$-alkyl.

3. The polymer of claim 2, wherein the at least one moiety P.1 is selected from the group consisting of moieties of formulae (P.1a), (P.1b), (P.1c), (P.1d), and (P.1e), (P.1a)
[phenyl ring with $[R]_k$, #—C(=O)— and NH—R' substituents]

(P.1b)
[phenyl ring with $[R]_k$, #—C(=O)— and COOH substituents]

(P.1c)
[naphthyl with $[R]_k$, #—C(=O)— and COOH substituents]

(P.1d)
[phthalimide-type structure with $[R]_k$ and # attachment]

(P.1e)
[naphthalimide-type structure with $[R]_k$ and # attachment]

wherein
# indicates the point of attachment to a nitrogen atom of the polyalkyleneimine backbone,
k is 0, 1, 2, 3 or 4,
R' is hydrogen, $C_1$-$C_4$-alkyl, —CHO, or —(C=O)—$C_1$-$C_4$-alkyl, and
R is independently or identical selected from the group consisting of halogen, OH, $NO_2$, $C_1$-$C_4$-alkoxy, $CONH_2$, NH—CHO, NH—$C_1$-$C_4$-alkyl, and NH—(C=O)—$C_1$-$C_4$-alkyl.

4. The polymer of claim 1, wherein the at least one moiety P.2 is a radical of formula:

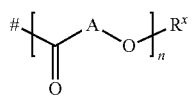

P.2 wherein
# indicates the point of attachment to a nitrogen atom of the polyalkyleneimine backbone,
n is a number in the range of 2 to 100,
A is independently at each instance a linear $C_2$-$C_8$-alkylene, which is unsubstituted or carries 1, 2, 3, or 4 $C_1$-$C_4$-alkyl radicals, and
$R^x$ is hydrogen, $C_1$-$C_{20}$-alkyl, $C_2$-$C_{20}$-alkenyl, C(=O)—$C_2$-$C_{20}$-alkenyl or C(=O)—$C_1$-$C_{20}$-alkyl, wherein $C_1$-$C_{20}$-alkyl and $C_2$-$C_{20}$-alkenyl are unsubstituted or carry 1 or 2 OH groups, wherein $C_2$-$C_{20}$-alkenyl has 1, 2, 3 or 4 olefinic C=C-double bonds, and wherein 1, 2, 3, or 4 non-adjacent $CH_2$ groups of $C_1$-$C_{20}$-alkyl may be replaced by O.

5. The polymer of claim 4, wherein:
A is 1,4-butandiyl or 1,5-pentandiyl or a combination thereof, and
$R^x$ is hydrogen, C(=O)—$C_6$-$C_{20}$-alkyl or C(=O)—$C_6$-$C_{20}$-alkenyl, wherein $C_6$-$C_{20}$-alkyl and $C_6$-$C_{20}$-alkenyl are unsubstituted or carry 1 or 2 OH groups.

6. The polymer of claim 1, wherein the poly(alkylenimine) is a poly(ethylenimine).

7. The polymer of claim 1, comprising
a) from 1 to 25% by weight, based on the total weight of the polymer, of the polyalkyleneimine backbone;
b) from 1 to 25% by weight, based on the total weight of the polymer, of the at least one aromatic moiety P.1; and
c) from 50 to 98% by weight, based on the total weight of the polymer, of the at least one aliphatic polyester moiety P.2.

8. The polymer of claim 1, wherein the poly(alkylenimine) further has protonated or quaternized amino groups.

9. A process for making the polymer according to claim 1, comprising:
i) reacting a polyalkyleneimine with an aromatic carboxylic acid or with an amide or imide forming derivative of an aromatic carboxylic acid, in such an amount that theoretically at most 90%, based on the total amount of primary and secondary nitrogen atoms of the polyalkyleneimine can be consumed, and
ii) reacting the product of i) with an aliphatic polyester, having a terminal carboxy group, or with at least one monomer, which reacts with the polyalkyleneimine by formation of at least one aliphatic polyester group P.2; or i') reacting a polyalkyleneimine with an aromatic carboxylic acid or with an amide or imide forming derivative of an aromatic carboxylic acid, in such an amount that theoretically at most 90%, based on the total amount of primary and secondary nitrogen atoms of the polyalkyleneimine can be consumed, and with at least one monomer, which reacts with the polyalkyleneimine by formation of at least one aliphatic polyester group P.2.

10. The process of claim 9, which has at least one of the following features a) to 0:
a) the amide or imide forming derivative of an aromatic carboxylic acid is a compound of formula (I):

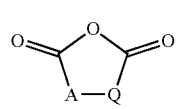

(I)

wherein
Q is a chemical bond or a divalent moiety selected from the group consisting of —O—, —NH— and —S—,
A is a unsubstituted or substituted aromatic group selected from the group consisting of the formulae

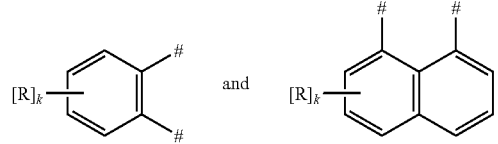

wherein # indicates the point of attachment to the rest of the molecule, and
k is 0, 1, 2, 3 or 4,
R is independently at each instance selected from the group consisting of halogen, $NO_2$, OH, $C_1$-$C_4$-alkyl, $C_1$-$C_4$-alkoxy, $CONH_2$, NH—CHO, NH—$C_1$-$C_4$-alkyl, and NH—(C=O)—$C_1$-$C_4$-alkyl;
b) in ii) and i') a monomer is reacted, which is an aliphatic lactone of formula (II) or a mixture of aliphatic lactones of the formula (II) or a mixture of at least one aliphatic lactone of the formula (II) with a fatty acid of formula (III)

wherein
A is independently from each other linear $C_2$-$C_8$-alkylene, which is unsubstituted or carries 1, 2, 3, or 4 $C_1$-$C_4$-alkyl radicals, and
$R^y$ is $C_1$-$C_{20}$-alkyl or $C_1$-$C_{20}$-alkenyl, wherein $C_1$-$C_{20}$-alkyl and $C_2$-$C_{20}$-alkyenl are unsubstituted or carry 1 or 2 OH groups, wherein $C_2$-$C_{20}$-alkenyl has 1, 2, 3 or 4 olefinic C=C-double bonds, and wherein 1, 2, 3, or 4 non-adjacent CH$_2$ groups of C$_1$-C$_{20}$-alkyl may be replaced by O;

c) in ii) a polyester of formula (IV) is reacted

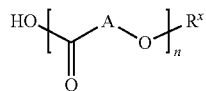

wherein n is a number in the range of 2 to 100,

A is independently at each instance a linear C$_2$-C$_8$-alkylene, which is unsubstituted or carries 1, 2, 3, or 4 C$_1$-C$_4$-alkyl radicals, and R$^x$ is hydrogen, C$_1$-C$_{20}$-alkyl, C$_2$-C$_{20}$-alkenyl, C(=O)—C$_2$-C$_{20}$-alkenyl or C(=O)—C$_1$-C$_{20}$-alkyl, wherein C$_1$-C$_{20}$-alkyl and C$_2$-C$_{20}$-alkenyl are unsubstituted or carry 1 or 2 OH groups, wherein C$_2$-C$_{20}$-alkenyl has 1, 2, 3 or 4 olefinic C=C-double bonds, and wherein 1, 2, 3, or 4 non-adjacent CH$_2$ groups of C$_1$-C$_{20}$-alkyl may be replaced by O;

d) the amount of the aromatic carboxylic acid or the amide or imide forming derivative of the aromatic carboxylic acid reacted in i) is from 10 to 200% by weight, based on polyalkylenimine and calculated as aromatic carboxylic acid;

e) the amount of the aliphatic polyester or the monomer is from 50 to 98% by weight, based on the total amount of the reactants of ii) or i'); or f) the process further comprises iii), where the product of ii) or i'), respectively, is quaternized or protonated.

11. A liquid composition in the form of a dispersion comprising:
   a fine particulate solid material, selected from the group consisting of pigments and fillers,
   a liquid diluent, wherein the fine particulate solid material is dispersed in the liquid diluent, and
   the polymer of claim 1.

12. The liquid composition of claim 11, where a weight ratio of the fine particulate solid material to the polymer is in the range from 100:1 to 1:50.

13. The liquid composition of claim 11, comprising
   i) 1 to 70% by weight, based on the total weight of the liquid composition, of the fine particulate solid material, selected from the group consisting of pigments and fillers;
   ii) 0.5 to 50% by weight, based on the total weight of the liquid composition, of the polymer, where the amount is calculated as solids contained in the polymer composition; and
   iii) 10 to 98.5% by weight, based on the total weight of the liquid composition, of the liquid diluent.

14. The liquid composition of claim 11, which is in the form of a pigment paste, a millbase, a colorant, a coating composition or an ink.

15. A dispersant comprising the polymer of claim 1 or a salt thereof.

* * * * *

UNITED STATES PATENT AND TRADEMARK OFFICE
CERTIFICATE OF CORRECTION

PATENT NO.        : 10,808,078 B2
APPLICATION NO.   : 15/998745
DATED             : October 20, 2020
INVENTOR(S)       : Kou et al.

It is certified that error appears in the above-identified patent and that said Letters Patent is hereby corrected as shown below:

On the Title Page

Column 2, Item (57), under "ABSTRACT", Line 3, delete "an carboxamide" and insert -- a carboxamide --, therefor.

Column 2, Item (57), under "ABSTRACT", Line 10, delete "an carboxamide" and insert -- a carboxamide --, therefor.

Column 2, Item (57), under "ABSTRACT", Lines 12-13, delete "an carboxamide" and insert -- a carboxamide --, therefor.

In the Specification

In Column 1, Line 6, delete "an carboxamide" and insert -- a carboxamide --, therefor.

In Column 2, Line 64, delete "hydroxyfatty" and insert -- hydroxyl fatty --, therefor.

In Column 2, Line 65, delete "hydroxyfatty" and insert -- hydroxyl fatty --, therefor.

In Column 3, Line 2, delete "hydroxyfatty" and insert -- hydroxyl fatty --, therefor.

In Column 3, Line 38, delete "an carboxamide" and insert -- a carboxamide --, therefor.

In Column 3, Lines 49-50, delete "an carboxamide" and insert -- a carboxamide --, therefor.

In Column 3, Line 53, delete "an carboxamide" and insert -- a carboxamide --, therefor.

In Column 4, Line 6, delete "an carboxamide" and insert -- a carboxamide --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*

In Column 5, Line 13, delete "1-ethyl pentyl, 2-ethyl pentyl," and insert -- 1-ethylpentyl, 2-ethylpentyl, --, therefor.

In Column 5, Line 16, delete "2-propyl pentyl," and insert -- 2-propylpentyl, --, therefor.

In Column 10, Line 18, delete "aminogroups." and insert -- amino groups. --, therefor.

In Column 14, Lines 50-55, delete " 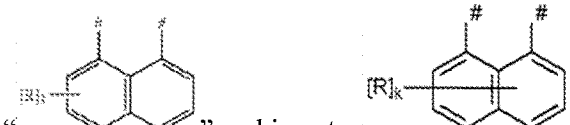 " and insert -- -- , therefor.

In Column 16, Line 67, delete "Theses" and insert -- These --, therefor.

In Column 17, Line 20, delete "titanaates)," and insert -- titanates), --, therefor.

In Column 18, Line 56, delete "an liquid" and insert -- a liquid --, therefor.

In Column 19, Line 9, delete "pigments/perlescent" and insert -- pigments/pearlescent --, therefor.

In Column 19, Line 63, delete "Metalcomplex" and insert -- Metal complex --, therefor.

In Column 20, Line 4, delete "Phthalocyanin" and insert -- Phthalocyanine --, therefor.

In Column 20, Line 22, delete "rutil or anatas," and insert -- rutile or anatase, --, therefor.

In Column 20, Line 32, delete "greene;" and insert -- green; --, therefor.

In Column 21, Line 23, delete "methylethyl" and insert -- methyl ethyl --, therefor.

In Column 21, Line 33, delete "methylethyl" and insert -- methyl ethyl --, therefor.

In Column 22, Line 29, delete "polyvinylalcohol" and insert -- polyvinyl alcohol --, therefor.

In Column 22, Line 30, delete "polyvinylbutyral." and insert -- polyvinyl butyral. --, therefor.

In the Claims

In Column 29, Claim 3, Line 8, delete "$NO_2$," and insert -- $NO_2$, $C_1$-$C_4$-alkyl, --, therefor.

In Column 29, Claim 9, Line 64, delete "carboxy" and insert -- carboxyl --, therefor.

In Column 30, Claim 10, Line 11, delete "0:" and insert -- f): --, therefor.

CERTIFICATE OF CORRECTION (continued)
U.S. Pat. No. 10,808,078 B2

In Column 30, Claim 10, Lines 29-35, delete " 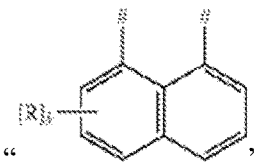 " and insert -- 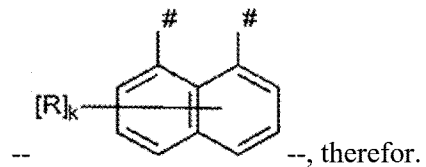 --, therefor.